US010669112B2

(12) United States Patent
Kitamura

(10) Patent No.: US 10,669,112 B2
(45) Date of Patent: Jun. 2, 2020

(54) MOTOR CONTROL APPARATUS, SHEET CONVEYANCE APPARATUS, AND IMAGE FORMING APPARATUS

(71) Applicant: CANON KABUSHIKI KAISHA, Tokyo (JP)

(72) Inventor: Shingo Kitamura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 15/703,617

(22) Filed: Sep. 13, 2017

(65) Prior Publication Data
US 2018/0079611 A1    Mar. 22, 2018

(30) Foreign Application Priority Data

Sep. 21, 2016  (JP) ................. 2016-184723

(51) Int. Cl.
*B65H 7/20*    (2006.01)
*B65H 1/04*    (2006.01)
(Continued)

(52) U.S. Cl.
CPC ................ *B65H 7/20* (2013.01); *B41J 29/38* (2013.01); *B65H 1/04* (2013.01); *B65H 5/021* (2013.01); *B65H 5/06* (2013.01); *H02P 21/22* (2016.02); *H02P 29/50* (2016.02); *H04N 1/00* (2013.01); *B41J 11/007* (2013.01); *B65H 2403/92* (2013.01); *B65H 2801/06* (2013.01);
(Continued)

(58) Field of Classification Search
CPC ................ B65H 5/021; B65H 2801/06; B65H 2403/92; B41J 11/007; H02P 21/22; H02P 29/50; G03G 15/6529; H04N 1/00

USPC ......................................................... 318/700
See application file for complete search history.

(56) References Cited

U.S. PATENT DOCUMENTS 6,177,774 B1 *   1/2001   Iwashita ............. H02H 7/0838
                                                        318/434
8,970,146 B2     3/2015   Pollock
(Continued)

FOREIGN PATENT DOCUMENTS

JP    2008-193869 A    8/2008
JP    2008-301566 A   12/2008
(Continued)

*Primary Examiner* — Jorge L Carrasquillo
*Assistant Examiner* — Devon A Joseph
(74) *Attorney, Agent, or Firm* — Canon U.S.A., Inc. IP Division

(57) ABSTRACT

To control a winding drive current of a motor based on a command phase representing a target phase of a rotor of the motor, a motor control apparatus includes a filter circuit, a phase determiner, and a controller. A current value of the drive current flowing through the winding is obtained at a predetermined period. The filter circuit reduces a harmonic component in a fundamental frequency of the drive current included in a signal indicated by the obtained current value. The phase determiner determines a rotation phase of the rotor based on a filter processed signal. The controller controls the winding drive current to reduce a deviation between the command phase and the determined rotation phase. The filter circuit reduces a harmonic component from a signal indicated by current values of which a number is not greater than a number of the current values obtained at the predetermined period.

15 Claims, 13 Drawing Sheets

(51) Int. Cl.

| | | |
|---|---|---|
| *B65H 5/06* | (2006.01) | |
| *B65H 5/02* | (2006.01) | |
| *H02P 21/22* | (2016.01) | |
| *H02P 29/50* | (2016.01) | |
| *H04N 1/00* | (2006.01) | |
| *B41J 29/38* | (2006.01) | |
| *B41J 11/00* | (2006.01) | |
| *G03G 15/00* | (2006.01) | |

(52) U.S. Cl.
CPC ............... *G03G 15/6529* (2013.01); *G03G 2215/00679* (2013.01); *G03G 2221/1657* (2013.01); *Y02P 70/20* (2015.11)

(56) References Cited

U.S. PATENT DOCUMENTS

| 9,515,589 | B2 | 12/2016 | Kozaki | |
|---|---|---|---|---|
| 9,952,545 | B2* | 4/2018 | Nito | H02P 8/14 |
| 2003/0020423 | A1* | 1/2003 | Kameyama | G03G 15/0194 318/560 |
| 2004/0214689 | A1* | 10/2004 | Kaneko | F02D 17/04 477/203 |
| 2009/0322264 | A1* | 12/2009 | Imura | B60L 15/025 318/400.09 |
| 2011/0080125 | A1* | 4/2011 | Shimada | H02P 5/74 318/400.09 |
| 2011/0180339 | A1* | 7/2011 | Kawamura | B60K 5/04 180/65.245 |
| 2011/0241578 | A1* | 10/2011 | Kim | H02P 21/14 318/400.02 |
| 2013/0127383 | A1* | 5/2013 | Kawamura | H02P 27/085 318/400.09 |
| 2013/0141953 | A1* | 6/2013 | Nakamura | B60L 3/0038 363/74 |
| 2013/0147407 | A1* | 6/2013 | Kawamura | H03K 17/0828 318/400.21 |
| 2017/0287434 | A1* | 10/2017 | Uekuri | G09G 5/003 |
| 2018/0076750 | A1* | 3/2018 | Yoshida | H02P 21/18 |

FOREIGN PATENT DOCUMENTS

| JP | 2012-111639 A | 6/2012 |
|---|---|---|
| JP | 2015-061323 A | 3/2015 |

* cited by examiner

MOTOR CONTROL APPARATUS, SHEET CONVEYANCE APPARATUS, AND IMAGE FORMING APPARATUS

BACKGROUND OF THE INVENTION

Field of the Invention

The present disclosure relates to a motor control apparatus for controlling a drive current flowing through a winding of a motor, a sheet conveyance apparatus, and an image forming apparatus.

Description of the Related Art

As a method for controlling a motor, a control method referred to as vector control which controls a motor by controlling a current value in a rotating coordinate system based on a rotation phase of a rotor of the motor is conventionally known. Specifically, a control method which controls a motor by performing phase feedback control for controlling a current value in a rotating coordinate system so as to reduce a deviation between a command phase and an actual rotation phase of a rotor is known. In addition, a control method which controls a motor by performing speed feedback control for controlling a current value in a rotating coordinate system so as to reduce a deviation between a command speed and an actual rotation speed of a rotor is also known.

In the vector control, a drive current flowing through windings of a motor is expressed by a q axis component (a torque current component) which is a current component generating torque for a rotor to rotate and a d axis component (an excitation current component) which is a current component affecting intensity of a magnetic flux penetrating through the windings of the motor. A value of the torque current component is controlled in response to a change in load torque in the rotor and thus the torque necessary for rotation is efficiently generated. Accordingly, increase of motor sound and increase of power consumption caused by surplus torque can be suppressed. In addition, the load torque in the rotor exceeds output torque corresponding to a drive current supplied to the motor winding, and thus the motor can be suppressed from being in an uncontrollable state (a step-out state).

In the vector control, a configuration for determining a rotation phase of a rotor is required. According to U.S. Pat. No. 8,970,146, a drive current flowing through a winding of each phase in a motor is detected, and an induced voltage generated in the winding of each phase in the motor is determined (calculated) based on the detected result. Further, U.S. Pat. No. 8,970,146 describes a configuration in which a rotation phase of a rotor is determined based on the induced voltage, and driving of the motor is controlled based on the determined rotation phase.

A detected current value is likely to include a value of a high-frequency signal including a harmonic component of a fundamental frequency of an electrical angle of the motor. U.S. Pat. No. 9,515,589 describes a configuration in which a motor drive apparatus is provided with a low-pass filter for reducing a signal of a frequency greater than or equal to a predetermined frequency (a cut-off frequency), and a high-frequency signal is reduced by the low-pass filter.

Japanese Patent Application Laid-Open No. 2008-193869 describes a configuration which changes a cut-off frequency according to a rotation speed of a motor.

When a high-frequency signal is reduced by a low-pass filter constituted of a digital filter, a frequency band which can be reduced by the low-pass filter varies depending on an order of the filter. Specifically, as the filter order is greater, a signal in a lower frequency band can be reduced.

In addition, a frequency of a harmonic component varies depending on a rotation speed of a rotor of the motor. Specifically, as the rotation speed of the rotor is slower, the frequency of the harmonic component becomes lower. Thus, the frequency of the harmonic component changes according to a change in the rotation speed of the rotor, and there is a possibility that a filter of the order set in advance cannot reduce a harmonic component signal. Specifically, for example, when the rotation speed of the rotor is slowed, there is a possibility that a filter of the order set in advance cannot reduce the harmonic component signal.

A frequency of a harmonic component varies depending on a type of a motor. Therefore, when a motor is replaced, if a motor different in type from the motor before replacement is installed, the filter of the order set in advance may not be able to reduce the harmonic component signal. Specifically, for example, when a frequency of the harmonic component included in a detected current of the motor after the replacement is lower than a frequency of the harmonic component included in a detected current of the motor before the replacement, the filter of the order set in advance may not be able to reduce noise. If the motor is controlled based on a current value of which the harmonic component signal is not reduced, motor control may be unstable.

In such cases, it can be considered to increase the filter order, however, as the filter order is greater, a memory usage such as a random access memory (RAM) increase, and accordingly a cost is increased.

SUMMARY OF THE INVENTION

The present disclosure is directed to reduction of a harmonic component included in a detected drive current without increasing a cost.

According to an aspect of the present invention, a motor control apparatus for controlling a drive current flowing through a winding of a motor based on a command phase representing a target phase of a rotor of the motor includes an obtaining unit configured to obtain a current value of the drive current flowing through the winding at a predetermined period, a filter circuit configured to reduce a harmonic component in a fundamental frequency of the drive current included in a signal indicated by the current value obtained by the obtaining unit, a phase determiner configured to determine a rotation phase of the rotor based on a signal to which filter processing is applied by the filter circuit, and a controller configured to control the drive current flowing through the winding to reduce a deviation between the command phase and the rotation phase determined by the phase determiner, wherein the filter circuit reduces a harmonic component from a signal indicated by current values of which a number is less than or equal to a number of the current values obtained by the obtaining unit at the predetermined period.

Further features of the present invention will become apparent from the following description of embodiments with reference to the attached drawings.

DESCRIPTION OF THE EMBODIMENTS

Various embodiments will now be described in detail below with reference to the drawings. However, shapes of components described in the embodiments and their relative positions are to be appropriately changed depending on a configuration and various conditions of an apparatus to which and embodiment is applied if necessary and thus, the scope of the present invention is not limited only to the embodiments described below. A case in which a motor control apparatus is installed in an image forming apparatus is described below, however, it is not limited to the image forming apparatus in which the motor control apparatus is installed. For example, the motor control apparatus may be used in a sheet conveyance apparatus for conveying a sheet of a recording medium, a document, and the like.

[Image Forming Apparatus]

Figure 1:
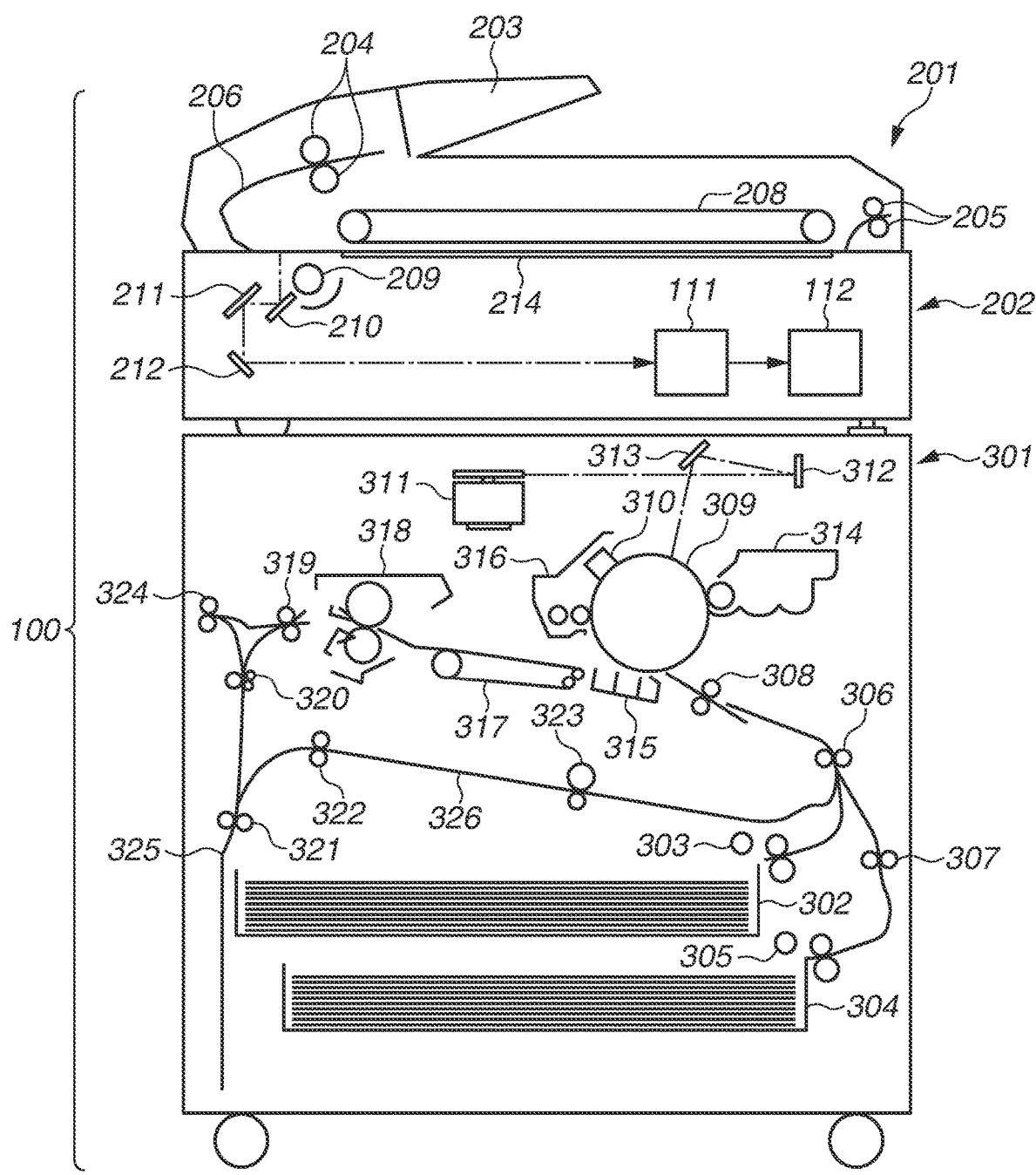
FIG. 1 is a cross-sectional view illustrating an image forming apparatus according to a first embodiment.

FIG. 1 is a cross-sectional view illustrating a configuration of an electrophotographic method monochromatic copy machine (hereinbelow, referred to as an image forming apparatus) 100 including a sheet conveyance apparatus used in a first embodiment. The image forming apparatus is not limited to the copy machine and may be, for example, a facsimile apparatus, a printing apparatus, and a printer. Further, the recording method is not limited to the electrophotographic method and may be, for example, an ink jet method can be used. Furthermore, the image forming apparatus may adopt any of a monochromatic format or a color format.

A configuration and a function of the image forming apparatus 100 are described below with reference to FIG. 1. As illustrated in FIG. 1, the image forming apparatus 100 includes a document feeding apparatus 201, a reading apparatus 202, and an image printing apparatus 301.

Documents placed on a document stacking unit 203 of the document feeding apparatus 201 are fed one by one by a sheet feeding roller 204 and conveyed onto a document glass platen 214 of the reading apparatus 202 along a conveyance guide 206. Further, the document is conveyed at a constant speed by a conveyance belt 208 and discharged to a discharge tray, which is not illustrated, by a sheet discharge roller 205. Reflected light from a document image which is illuminated by an illumination system 209 at a reading position of the reading apparatus 202 is guided to an image reading unit 111 by an optical system constituted of reflection mirrors 210, 211, and 212 and converted into an image signal by the image reading unit 111. The image reading unit 111 is constituted of a lens, a charge coupled device (CCD) which is a photoelectric conversion element, a drive circuit of the CCD, and the like. An image signal output from the image reading unit 111 is subjected to various correction processing by an image processing unit 112 constituted of a hardware device such as an application specific integrated circuit (ASIC) and output to the image printing apparatus 301. Reading of a document is performed as described above. In other words, the document feeding apparatus 201 and the reading apparatus 202 function as a document reading apparatus.

Document reading modes includes a first reading mode and a second reading mode. The first reading mode is a mode for reading an image on a document conveyed at a constant speed by the illumination system 209 and the optical system which are fixed to a predetermined position. The second reading mode is a mode for reading an image on a document placed on the document glass platen 214 of the reading apparatus 202 by the illumination system 209 and the optical system which move at a constant speed. Normally, an image on a sheet-shaped document is read in the first reading mode, and an image on a bound document such as a book and a booklet is read in the second reading mode.

The image printing apparatus 301 includes sheet storage trays 302 and 304 therein. The sheet storage trays 302 and 304 each can store different types of recording media. For example, the sheet storage tray 302 stores A4 size plain paper, and the sheet storage tray 304 stores A4 size thick paper. A recording medium is the one on which an image is formed by the image forming apparatus, and, for example, a sheet, a resin sheet, cloth, an overhead projector (OHP) sheet, a label, and the like are included in the recording media.

The recording medium stored in the sheet storage tray 302 is fed by a sheet feeding roller 303 and conveyed by a conveyance roller 306 to a registration roller 308. The recording medium stored in the sheet storage tray 304 is fed by a sheet feeding roller 305 and conveyed by conveyance rollers 307 and 306 to the registration roller 308.

An image signal output from the reading apparatus 202 is input to an optical scanning apparatus 311 including a semiconductor laser and a polygon mirror. A photosensitive drum 309 is charged by a charger 310 on an outer circumferential surface thereof. After the outer circumferential surface of the photosensitive drum 309 is charged, a laser beam corresponding to the image signal input from the reading apparatus 202 to the optical scanning apparatus 311 is emitted from the optical scanning apparatus 311 to the outer circumferential surface of the photosensitive drum 309 via the polygon mirror and mirror 312 and 313. Accordingly, an electrostatic latent image is formed on the outer circumferential surface of the photosensitive drum 309.

Subsequently, the electrostatic latent image is developed by a toner in a developing unit 314, and a toner image formed on the outer circumferential surface of the photosensitive drum 309. The toner image formed on the photosensitive drum 309 is transferred to the recording medium by a transfer charger 315 installed on a position (a transfer position) facing the photosensitive drum 309. In accordance with a transfer timing, the registration roller 308 transmits the recording medium to the transfer position.

As described above, the recording medium on which the toner image is transferred is transmitted by a conveyance belt 317 to the fixing device 318 and heated and pressed by a fixing device 318, and thus the toner image is fixed to the recording medium. The image forming apparatus 100 thus forms an image on a recording medium.

When an image is formed in a one-sided printing mode, a recording medium passed through the fixing device 318 is discharged to the discharge tray, which is not illustrated, by sheet discharge rollers 319 and 324. When an image is formed in a two-sided printing mode, the fixing device 318 performs fixing processing on a first surface of a recording medium, and then the recording medium is conveyed to a reversing path 325 by the sheet discharge roller 319, a conveyance roller 320, and a reversing roller 321. Subsequently, the recording medium is conveyed to the registration roller 308 again by conveyance rollers 322 and 323, and an image is formed on a second surface of the recording medium by the above-described method. Subsequently, the recording medium is discharged to the discharge tray, which is not illustrated, by the sheet discharge rollers 319 and 324.

When the recording medium which is subjected to the image forming on the first surface is discharged with its face down to the outside of the image forming apparatus 100, the recording medium passed through the fixing device 318 is conveyed to a direction toward the conveyance roller 320 through the sheet discharge roller 319. Subsequently, rotation of the conveyance roller 320 is reversed immediately before a rear end of the recording medium passes through the nip portion of the conveyance roller 320, and thus the recording medium is discharged with the first surface thereof face down to the outside of the image forming apparatus 100 via the sheet discharge roller 324.

Thus, the configuration and the function of the image forming apparatus 100 are described above. A load according to an embodiment is an object driven by a motor. For example, various rollers (conveyance rollers) such as the sheet feeding rollers 204, 303, and 305, the registration roller 308, and the sheet discharge roller 319, the photosensitive drum 309, the conveyance belts 208 and 317, the illumination system 209, and the optical system are regarded as loads according to an embodiment. The motor control apparatus according to the present embodiment can be applied to a motor which drives these loads.

Figure 2:
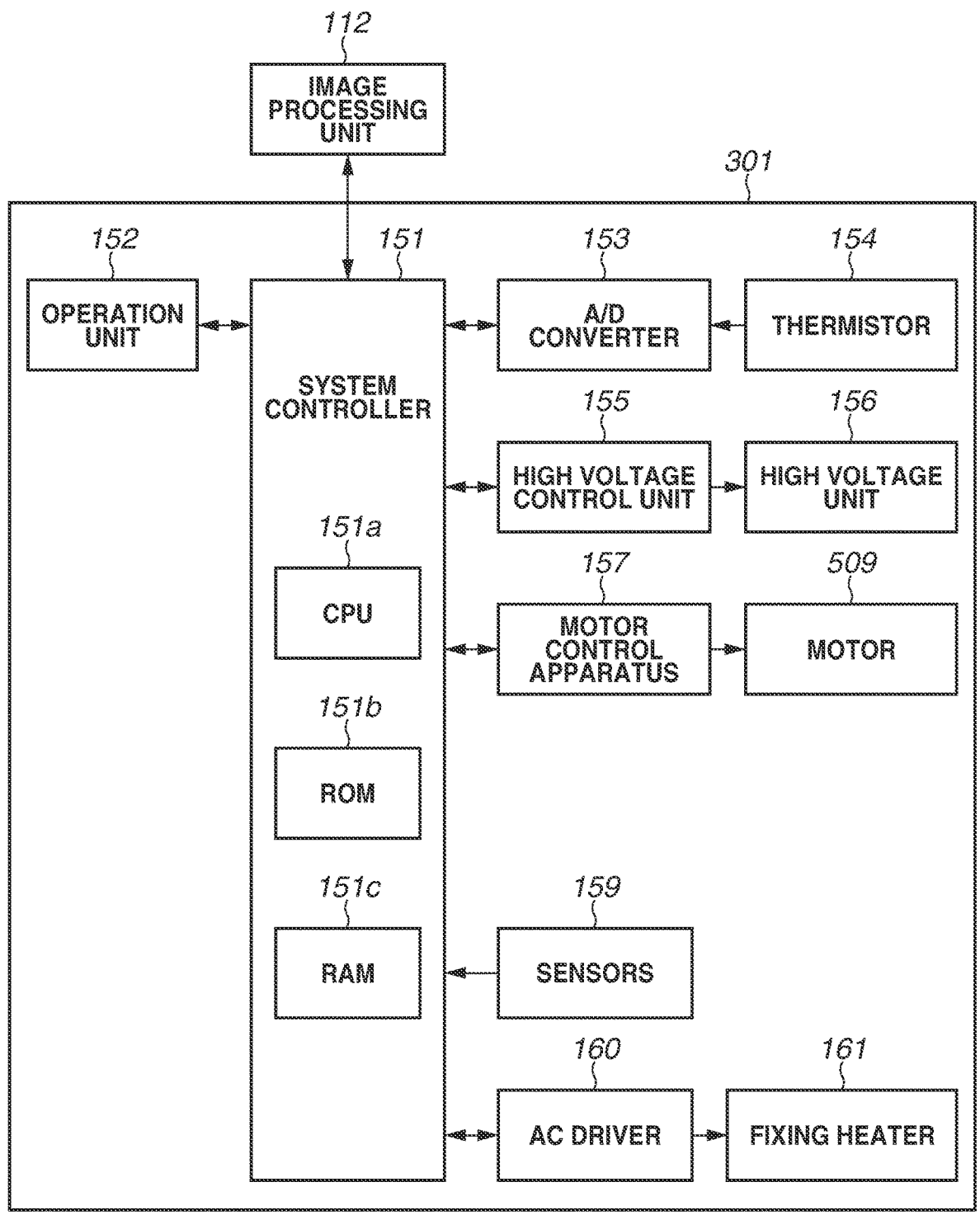
FIG. 2 is a block diagram illustrating a control configuration of the image forming apparatus.

FIG. 2 is a block diagram illustrating an example of a control configuration of the image forming apparatus 100. A system controller 151 includes a central processing unit (CPU) 151a, a read-only memory (ROM) 151b, and a random access memory (RAM) 151c as illustrated in FIG. 2. The system controller 151 is connected to the image processing unit 112, an operation unit 152, an analog-to-digital (A/D) converter 153, a high voltage control unit 155, a motor control apparatus 157, sensors 159, and an alternate current (AC) driver 160. The system controller 151 can transmit and receive data and a command to and from each connected unit.

The CPU 151a reads and executes various programs stored in the ROM 151b and thus executes various sequences related to a predetermined image forming sequence.

The RAM 151c is a storage device. The RAM 151c stores various data pieces, such as a setting value to the high voltage control unit 155, a command value to the motor control apparatus 157, and information received from the operation unit 152.

The system controller 151 transmits setting value data of each apparatus installed within the image forming apparatus 100 necessary for image processing in the image processing unit 112 to the image processing unit 112. Further, the system controller 151 receives a signal from the sensors 159 and sets a setting value of the high voltage control unit 155 based on the received signal. The high voltage control unit 155 supplies a voltage necessary for high voltage units 156 (the charger 310, the developing unit 314, the transfer charger 315, and the like) according to the setting value set by the system controller 151. The sensors 159 include a sensor for detecting a recording medium conveyed by the conveyance roller and other sensors The motor control apparatus 157 controls the motor 509 for driving a load according to a command output from the CPU 151a. In FIG. 2, the motor 509 is illustrated as a motor in the image forming apparatus, however, the image forming apparatus is actually provided with a plurality of motors. One motor control apparatus may control a plurality of motors. Further, in FIG. 2, one motor control apparatus is shown provided, however, a plurality of the motor control apparatuses is actually installed in the image forming apparatus.

The A/D converter 153 receives a detection signal detected by a thermistor 154 for detecting a temperature of a fixing heater 161, converts the detection signal from an analog signal to a digital signal, and transmits the digital signal to the system controller 151. The system controller 151 controls the AC driver 160 based on the digital signal received from the A/D converter 153. The AC driver 160 controls the fixing heater 161 so that a temperature of the fixing heater 161 to be a temperature necessary for performing fixing processing. The fixing heater 161 is a heater used in the fixing processing and included in the fixing device 318.

The system controller 151 controls the operation unit 152 to display an operation screen enabling a user to set a type and the like of a recording medium (hereinbelow referred to as a sheet type) to be used on a display unit provided in the operation unit 152. The system controller 151 receives information set by the user from the operation unit 152 and controls an operation sequence of the image forming apparatus 100 based on the information set by the user. Further, the system controller 151 transmits information indicating a state of the image forming apparatus to the operation unit 152. The information indicating the state of the image forming apparatus is, for example, the number of image forming sheets, a progress status of an image forming operation, information regarding a jam and overlapping conveyance of sheets in the document feeding apparatus 201 and the image printing apparatus 301, and the like. The operation unit 152 displays the information received from the system controller 151 on the display unit.

The system controller 151 thus controls the operation sequence of the image forming apparatus 100 as described above.

[Motor Control Apparatus]

Next, the motor control apparatus according to the present embodiment is described. The motor control apparatus according to the present embodiment controls the motor using vector control. In the below description, following control is performed based on a rotation phase $\theta$ as an electrical angle, a command phase θ_ref, and a phase of the current, however, the following control may be performed by, for example, converting an electrical angle to a mechanical angle and based on the mechanical angle.

<Vector Control>

First, a method for performing vector control by the motor control apparatus 157 according to the present embodiment is described with reference to FIGS. 3 and 4. The motor in the following description is not provided with a sensor such as a rotary encoder for detecting a rotation phase of a rotor of the motor.

Figure 3:
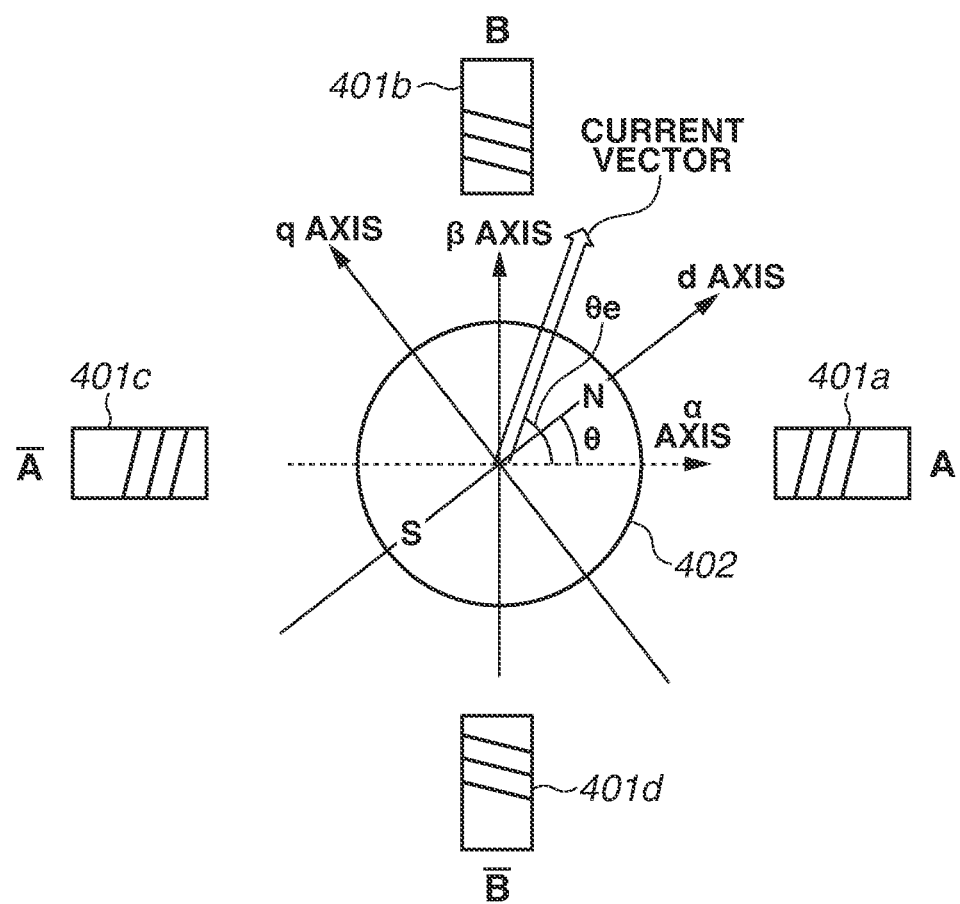
FIG. 3 illustrates a relationship between a two phase motor including an A phase and a B phase and a d axis and a q axis in a rotating coordinate system.

FIG. 3 illustrates a relationship between a stepping motor (hereinbelow, referred to as a motor) 509 consisting of two phases of an A phase (a first phase) and a B phase (a second phase) and a rotating coordinate system expressed by a d axis and a q axis. In FIG. 3, an α axis corresponding to a winding of the A phase and a β, axis corresponding to a winding of the B phase are defined in a stationary coordinate system. Further, in FIG. 3, the d axis is defined along a direction of a magnetic flux generated by a magnetic pole of a permanent magnet used in a rotor 402, and the q axis is defined along a direction advanced 90 degrees counterclockwise from the d axis (a direction perpendicular to the d axis). An angle formed by the α axis and the d axis is defined as θ, and a rotation phase of the rotor 402 is expressed by a degree θ. In the vector control, the rotating coordinate system based on the rotation phase θ of the rotor 402 is used. Specifically, in the vector control, a q axis component (a torque current component) generating torque in a rotor and a d axis component (an excitation current component) affecting intensity of a magnetic flux penetrating through the winding are used which are current components in the rotating coordinate system of a current vector corresponding to a drive current flowing through the winding.

The vector control is a control method for controlling a motor by performing phase feedback control which controls a torque current component value and an excitation current component value so as to reduce a deviation between a command phase representing a target phase and an actual rotation phase of a rotor. In addition, there is a control method for controlling a motor by performing speed feedback control which controls a torque current component value and an excitation current component value so as to reduce a deviation between a command speed representing a target speed and an actual rotation speed of a rotor.

Figure 4:
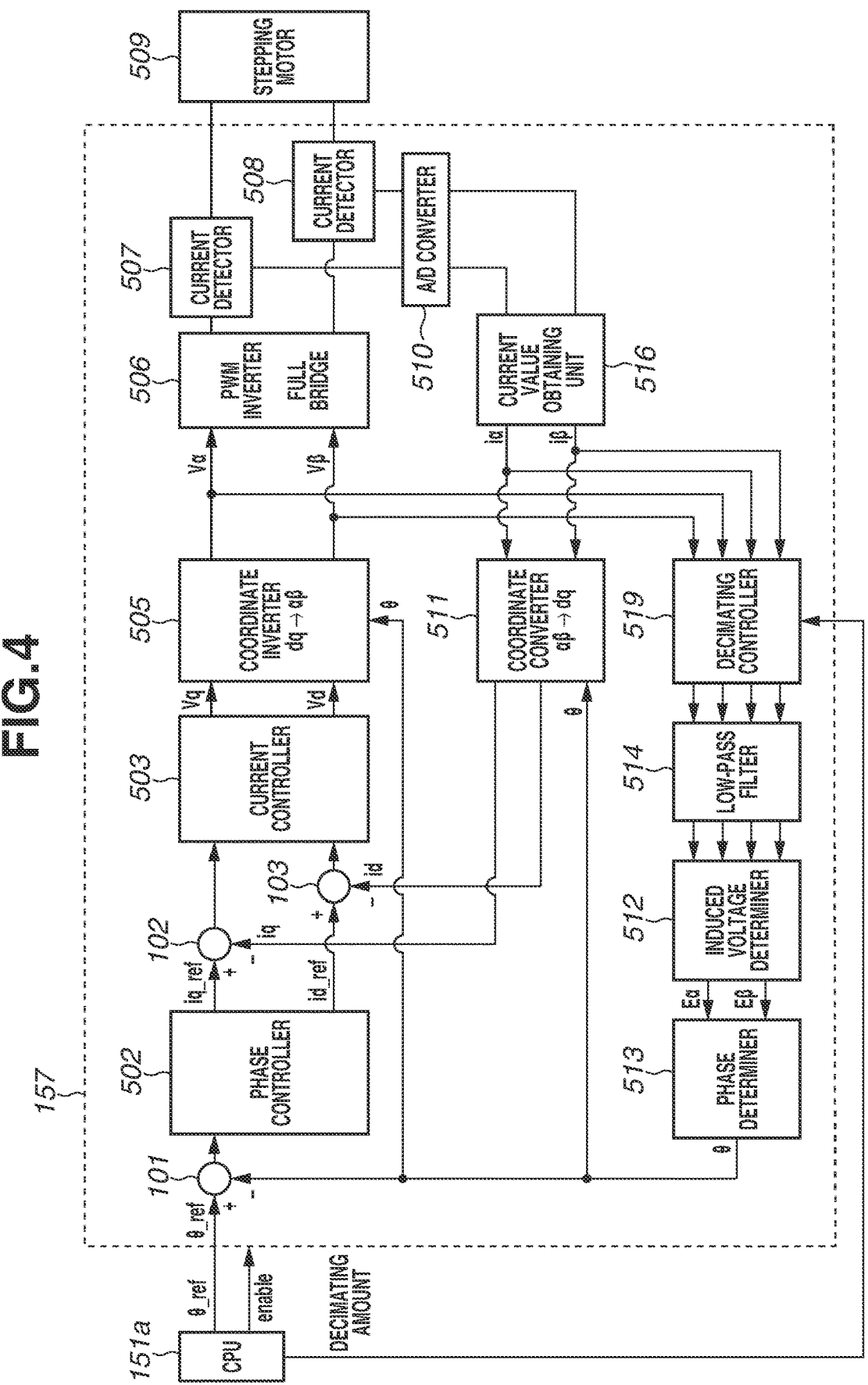
FIG. 4 is a block diagram illustrating a configuration of a motor control apparatus according to the first embodiment.

FIG. 4 is a block diagram illustrating an example of a configuration of the motor control apparatus 157 for controlling the motor 509. The motor control apparatus 157 is constituted of at least one ASIC and executes each function described below.

As illustrated in FIG. 4, the motor control apparatus 157 includes a phase controller 502, a current controller 503, a coordinate inverter 505, a coordinate converter 511, a pulse-width modulation (PWM) inverter 506 for supplying a drive current to the motor winding, and the like as circuits for performing the vector control. The coordinate converter 511 converts coordinates of the current vectors corresponding to the drive currents flowing through the windings of the A phase and the B phase of the motor 509 from the stationary coordinate system expressed by the α axis and the β, axis to the rotating coordinate system expressed by the q axis and the d axis. Accordingly, the drive current flowing through the winding is expressed by a current value of the q axis component (a q axis current) and a current value of the d axis component (a d axis current) which are current values in the rotating coordinate system. The q axis current corresponds to a torque current for generating torque in the rotor 402 of the motor 509. The d axis current corresponds to an excitation current affecting intensity of a magnetic flux penetrating through the winding of the motor 509 which does not contribute to torque generation in the rotor 402. The motor control apparatus 157 can independently control each of the q axis current and the d axis current. Accordingly, the motor control apparatus 157 controls the q axis current in response to load torque in the rotor 402 and thus can efficiently generate torque necessary for the rotor 402 to rotate. In other words, in the vector control, a magnitude of the current vector illustrated in FIG. 3 changes in response to the load torque in the rotor 402.

The motor control apparatus 157 determines the rotation phase θ of the rotor 402 of the motor 509 by a method described below and performs the vector control based on the determined result. The CPU 151*a* generates a command phase θ_ref representing the target phase of the rotor 402 of the motor 509 based on a predetermined operation sequence of the motor 509 and outputs the command phase θ_ref to the motor control apparatus 157.

A subtractor 101 calculates a deviation between the rotation phase θ of the rotor 402 of the motor 509 output from a phase determiner 513 and the command phase θ_ref and outputs the deviation to the phase controller 502.

The phase controller 502 generates and outputs a q axis current command value iq_ref and a d axis current command value id_ref based on proportional control (P), integration control (I), and differential control (D) so as to reduce the deviation input from the subtractor 101. Specifically, the phase controller 502 generates and outputs the q axis current command value iq_ref and the d axis current command value id_ref based on the P control, the I control, and the D control so that the deviation input from the subtractor 101 becomes zero. The P control is a control method for controlling a control target value based on a value proportional to a deviation of a command value and an estimation value. The I control is a control method for controlling a control target value based on a value proportional to time integration of a deviation of a command value and an estimation value. The D control is a control method for controlling a control target value based on a value proportional to a temporal change of a deviation of a command value and an estimation value. The phase controller 502 according to the present embodiment generates the q axis current command value iq_ref and the d axis current command value id_ref based on the PID control, however, the control method is not limited to the above-described one. For example, the phase controller 502 may generate the q axis current command value iq_ref and the d axis current command value id_ref based on the PI control. In addition, according to the present embodiment, the phase controller 502 obtains the deviation input from the subtractor 101 at a period TO. In other words, the q axis current command value iq_ref and the d axis current command value id_ref output from the phase controller 502 are updated at each period TO. When a permanent magnet is used in the rotor 402, the d axis current command value id_ref affecting the intensity of the magnetic flux penetrating through the winding is normally set to zero, however, the value is not limited to the above-described one.

The drive currents flowing through the windings of the A phase and the B phase of the motor 509 are detected by current detectors 507 and 508 and subsequently converted from analog values to digital values by an A/D converter 510.

A current value obtaining unit 516 obtains current values of the drive currents converted from the analog values to the digital values by the A/D converter 510 in a period shorter than the period T0.

The current values obtained by the current value obtaining unit 516 are expressed as current values $i\alpha$ and $i\beta$ in the stationary coordinate system by following formulae using a phase $\theta e$ of the current vector illustrated in FIG. 3. The phase $\theta e$ of the current vector is defined as an angle formed by the $\alpha$ axis and the current vector. I represents a magnitude of the current vector $$i\alpha = I^* \cos \theta e \quad (1)$$

$$i\beta = I^* \sin \theta e \quad (2)$$

The current values $i\alpha$ and $i\beta$ are input to the coordinate converter 511 and a decimating controller 519.

The coordinate converter 511 converts the current values $i\alpha$ and $i\beta$ in the stationary coordinate system to a current value iq of the q axis current and a current value id of the d axis current in the rotating coordinate system by following formulae.

$$id = \cos \theta^* i\alpha + \sin \theta^* i\beta \quad (3)$$

$$iq = -\sin \theta^* i\alpha + \cos \theta^* i\beta \quad (4)$$

To a subtractor 102, the q axis current command value iq_ref output from the phase controller 502 and the current value iq output from the coordinate converter 511 are input. The subtractor 102 calculates a deviation between the q axis current command value iq_ref and the current value iq output from the coordinate converter 511 and outputs the deviation to the current controller 503.

To a subtractor 103, the d axis current command value id_ref output from the phase controller 502 and the current value id output from the coordinate converter 511 are input. The subtractor 103 calculates a deviation between the d axis current command value id_ref and the current value id output from the coordinate converter 511 and outputs the deviation to the current controller 503.

The current controller 503 generates drive voltages Vq and Vd based on the PID control so as to reduce the deviations respectively input thereto. Specifically, the current controller 503 generates the drive voltages Vq and Vd so that the input deviations respectively become zero and outputs the voltages to the coordinate inverter 505. In other words, the current controller 503 functions as a generation unit. The current controller 503 according to the present embodiment generates the drive voltages Vq and Vd based on the PID control, however, the control method is not limited to the above-described one. For example, the current controller 503 may generate the drive voltages Vq and Vd based on the PI control.

The coordinate inverter 505 inversely converts the drive voltages Vq and Vd in the rotating coordinate system output from the current controller 503 into drive voltages V$\alpha$ and V$\beta$, in the stationary coordinate system by following formulae.

$$V\alpha = \cos \theta^* Vd - \sin \theta^* Vq \quad (5)$$

$$V\beta = \sin \theta^* Vd + \cos \theta^* Vq \quad (6)$$

The coordinate inverter 505 outputs the inversely converted drive voltages V$\alpha$ and V$\beta$, to the decimating controller 519 and the PWM inverter 506.

The PWM inverter 506 includes a full bridge circuit. The full bridge circuit is driven by a PWM (pulse width modulation) signal based on the drive voltages V$\alpha$ and V$\beta$ input from the coordinate inverter 505. Accordingly, the PWM inverter 506 generates drive currents $i\alpha$ and $i\beta$ corresponding to the drive voltages V$\alpha$ and V$\beta$, supplies the drive currents $i\alpha$ and $i\beta$ to the winding of each phase of the motor 509, and thus drives the motor 509. In other words, the PWM inverter 506 functions as a supply unit for supplying a current to the winding of each phase of the motor 509. According to the present embodiment, the PWM inverter includes the full bridge circuit, however, the PWM inverter may include, for example, a half bridge circuit. A period that the PWM inverter generates the drive currents $i\alpha$ and $i\beta$ corresponding to the drive voltages V$\alpha$ and V$\beta$, and supplies the drive currents to the windings (hereinbelow, referred to as an inverter period) is synchronized with a period that the current value obtaining unit 516 obtains a current value. This is because the PWM inverter is driven by the drive voltages V$\alpha$ and V$\beta$, generated based on the current value obtained by the current value obtaining unit 516.

Next, a method for determining the rotation phase $\theta$ is described.

As described above, the current values $i\alpha$ and $i\beta$ converted from analog values to digital values by the A/D converter 510 and the drive voltages V$\alpha$ and V$\beta$, output from the coordinate inverter 505 are also input to the decimating controller 519. The current values $i\alpha$ and $i\beta$ and the drive voltages V$\alpha$ and V$\beta$, subjected to decimating processing by the decimating controller 519 are input to a low-pass filter 514. The low-pass filter 514 reduces harmonic component signals included in the current values $i\alpha$ and $i\beta$ and the drive voltages V$\alpha$ and V$\beta$, and outputs the current values $i\alpha$ and $i\beta$ and the drive voltages V$\alpha$ and V$\beta$, of which the harmonic component signals are reduced to an induced voltage determiner 512. In other words, the low-pass filter 514 functions as a filter circuit according to an embodiment. The decimating controller 519 and the low-pass filter 514 are described below.

The induced voltage determiner 512 determines an induced voltage generated in the winding in each phase of the motor by the rotation of the rotor. Specifically, the induced voltage determiner 512 calculates induced voltages E$\alpha$ and E$\beta$, by following formulae based on the current values $i\alpha$ and $i\beta$ and the drive voltages V$\alpha$ and V$\beta$, output from the low-pass filter 514.

$$E\alpha = V\alpha - R^* i\alpha - L^* di\alpha/dt \quad (7)$$

$$E\beta = V\beta - R^* i\beta - L^* di\beta/dt \quad (8)$$

Here, R represents a winding resistance, and L represents a winding inductance. Values of the winding resistance R and the winding inductance L are specific to the motor 509 to be used and stored in advance in the ROM 151*b* or a memory (not illustrated) installed in the motor control apparatus 157.

The induced voltages E$\alpha$ and E$\beta$, determined by the induced voltage determiner 512 are output to the phase determiner 513.

The phase determiner 513 determines the rotation phase $\theta$ of the rotor as the electrical angle by a following formula based on a ratio of the induced voltage E$\alpha$ and the induced voltage E$\beta$, output from the induced voltage determiner 512.

$$\theta = \tan^{-1}(-E\beta/E\alpha) \quad (9)$$

According to the present embodiment, the phase determiner 513 determines the rotation phase $\theta$ by calculation based on the formula (9), however, the determination method is not limited to the above-described one. For example, the phase determiner 513 may determine the rotation phase θ by referring to a table indicating relationships between the induced voltage Eα and the induced voltage Eβ, and the rotation phase θ corresponding to the induced voltage Eα and the induced voltage Eβ, stored in the ROM 151b and the like.

The rotation phase θ of the rotor 402 obtained as described above is input to an adder 101, the coordinate inverter 505, and the coordinate converter 511.

The motor control apparatus 157 repeats the above-described control.

As described above, the motor control apparatus 157 according to the present embodiment performs the vector control using the phase feedback control for controlling the current value in the rotating coordinate system so as to reduce the deviation between the command phase θ_ref and the rotation phase θ and thus can suppress a step-out state of the motor and increase of motor sound and power consumption due to surplus torque. Further, the motor control apparatus 157 can control the rotation phase of the rotor to be a desired phase by performing the phase feedback control. Therefore, the vector control by the phase feedback control is applied to the motor for driving the load (the registration roller and the like) necessary to be accurately control the rotation phase thereof, and thus an image can be appropriately formed on a recording medium in the image forming apparatus.

<Low-Pass Filter>

Next, the low-pass filter 514 according to the present embodiment is described.

As described above, according to the present embodiment, the rotation phase θ is determined based on a current value of the drive current detected by the current detectors 507 and 508. The detected current value includes a harmonic component in a fundamental frequency of the drive current flowing through the motor winding. When the motor is controlled based on the current value including the harmonic component signal, the control of the motor may be unstable.

Thus, the motor control apparatus 157 according to the present embodiment is provided with the low-pass filter 514 which reduces a signal with a predetermined frequency or greater as illustrated in FIG. 4. Specifically, the motor control apparatus 157 according to the present embodiment is provided with the low-pass filter 514 which reduces a value of a signal with a frequency greater than the fundamental frequency of the drive current included in the input current value. The signal with the frequency greater than the fundamental frequency of the drive current includes, for example, the above-described harmonic component signal and a high-frequency component signal due to electromagnetic noise and the like. The motor is controlled based on the current value of which the harmonic component signal is reduced by the low-pass filter, and thus the motor control can be suppressed from being unstable.

Figure 5:
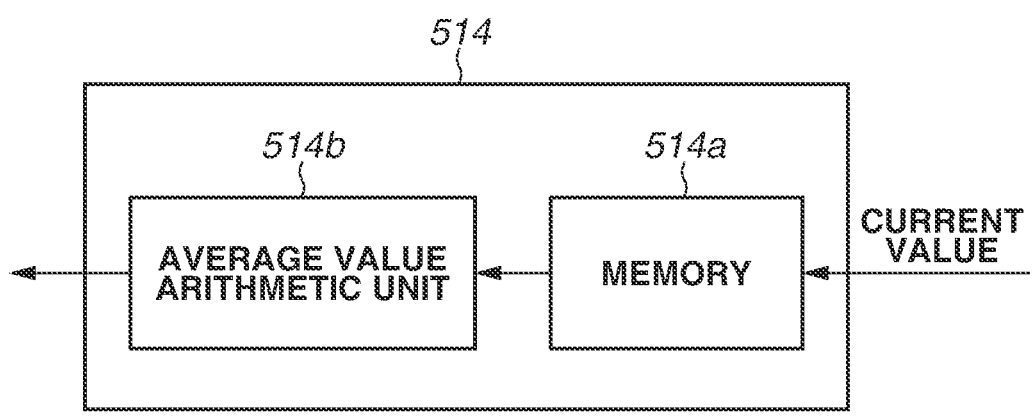
FIG. 5 is a block diagram illustrating a configuration of a low-pass filter according to the first embodiment.

FIG. 5 is a block diagram illustrating an example of a configuration of the low-pass filter 514. The low-pass filter 514 according to the present embodiment is a digital filter to which a predetermined filter order is set. The low-pass filter 514 is described below. According to the present embodiment, the filter order is set to 30th order in advance. Further, according to the present embodiment, the filter order can be changed in a range less than or equal to 30th order.

As illustrated in FIG. 5, the low-pass filter 514 includes a memory 514a for storing a plurality of current values output from the current value obtaining unit 516 and an average value arithmetic unit 514b for calculating an average value of the plurality of current values stored in the memory 514a.

The low-pass filter 514 obtains and stores the current value output from the current value obtaining unit 516 in the memory 514a. The average value arithmetic unit 514b calculates and outputs an average value of the current values stored in the memory 514a. Specifically, for example, when the order of the low-pass filter 514 is 30th order, the low-pass filter 514 stores 30 pieces of the current values output from the current value obtaining unit 516 in the memory 514a and calculates an average value of the 30 pieces of the current values. When 31st and subsequent current values are obtained, each time a piece of the current value is obtained, the memory 514a deletes the oldest stored current value among the stored current values and stores the obtained current value. Further, the average value arithmetic unit 514b performs the above-described calculation each time the memory 514a stores the current value. The configuration of the filter is not limited to the above-described one which calculates an average value and may be a digital filter which can reduce a signal.

When a signal is reduced by a low-pass filter constituted of a digital filter, a frequency band which can be reduced by the low-pass filter varies depending on the filter order. Specifically, as the filter order is greater, a signal having a lower frequency is reduced. Therefore, in order to reduce a signal having a lower frequency, it is necessary to set the filter order to a greater order.

A frequency of the harmonic component varies depending on the rotation speed of the rotor of the motor. Specifically, as the rotation speed of the rotor is slower, the frequency of the harmonic component is lower. Thus, the frequency of the harmonic component changes according to a change in the rotation speed of the rotor, and there is a possibility that the filter of the order set in advance cannot reduce a harmonic component signal. Specifically, for example, when the rotation speed of the rotor is slowed, there is a possibility that the filter of the order set in advance cannot reduce the harmonic component signal. When the phase of the rotor is determined based on the current value of which the harmonic component signal is not reduced, and the motor is controlled based on the determined rotation phase, the motor control may be unstable.

Next, a frequency of the harmonic component signal is described. In the following description, a motor A of which the number of magnetic poles of rotors is 100 (50 each in N pole and S pole) is used, however, the number of magnetic poles of the motor to be used is not limited to the above-described one. According to the present embodiment, a period (a sampling period) at which the current value obtaining unit 516 obtains the current value is 25 μs. The period TO at which the current command values iq_ref and id_ref output from the phase controller 502 are updated is 200 μs.

Regarding the motor A, a mechanical angle 7.2° corresponds to an electrical angle 360°. In other words, when the rotor of the motor A makes one round, the electrical angle makes 50 rounds. Therefore, for example, when the motor A is driven at a rotation speed of 10 rps, an electrical angle frequency is 500 Hz.

On the drive current detected by the current detector, not only a signal of the electrical angle frequency but also the harmonic component signal of the electrical angle frequency is superimposed. For example, a third order component, a fifth order component, and the like of the electrical angle frequency are superimposed.

Figure 6A:
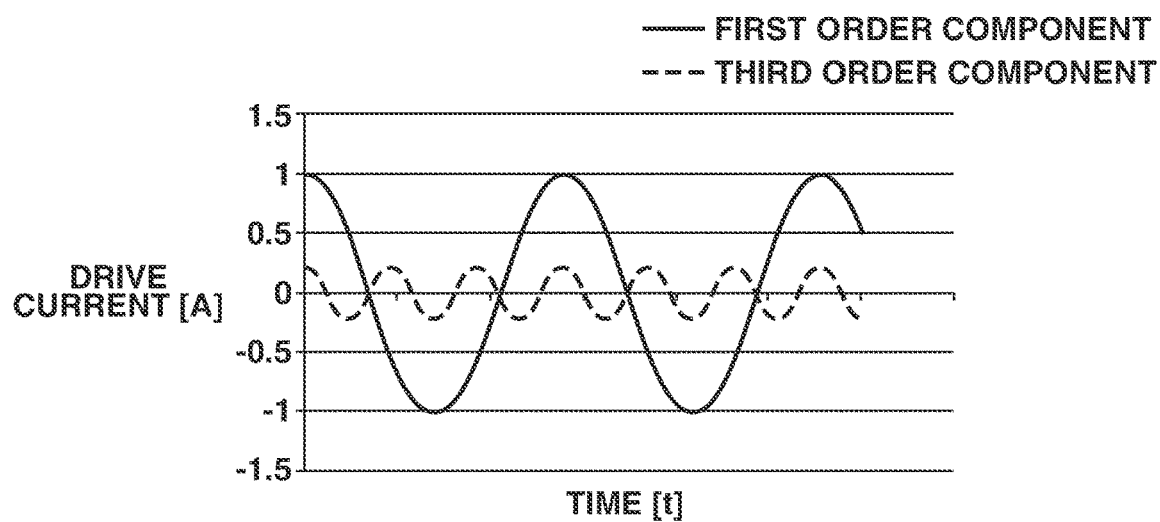
FIG. 6A illustrates an example of first order component and third order component signals of an electrical angle frequency.
Figure 6B:
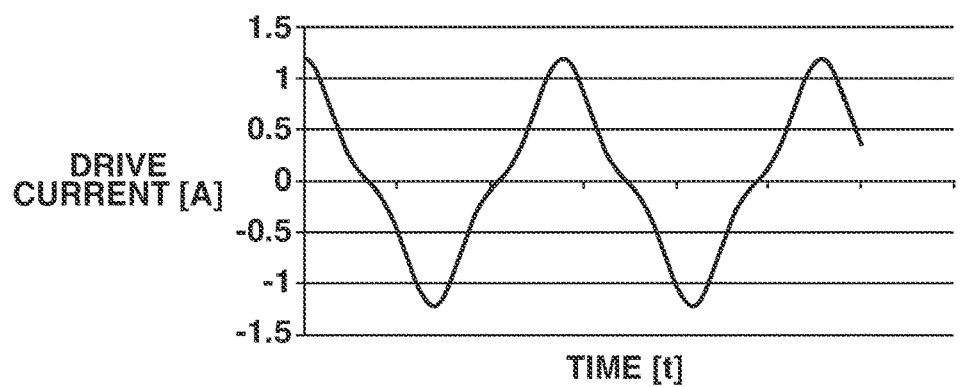
FIG. 6B illustrates an example of a signal obtained by synthesizing the first order component signal and the third order component signal of the electrical angle frequency.

FIG. 6A illustrates an example of a first order component signal and a third order component signal of the electrical angle frequency. FIG. 6B illustrates an example of a signal obtained by synthesizing the first order component signal and the third order component signal of the electrical angle frequency. Further, FIG. 6C illustrates an example of induced voltages determined based on the signal illustrated in FIG. 6B and an electrical angle determined based on the induced voltages.

Figure 6C:
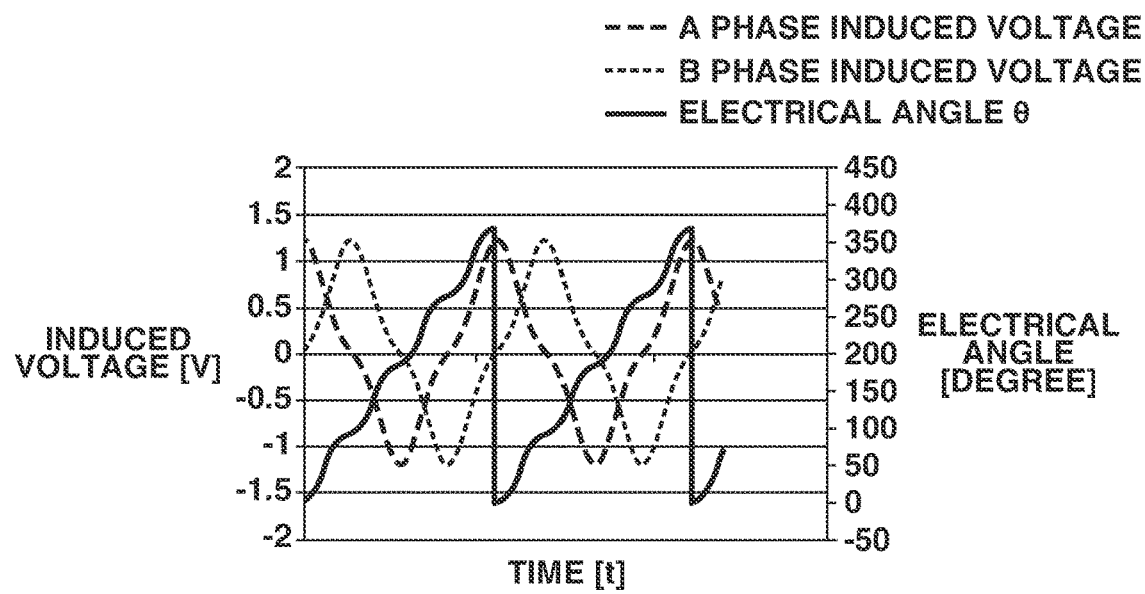
FIG. 6C illustrates an example of an induced voltage and an electrical angle determined based on the induced voltage.

As illustrated in FIG. 6C, when an electrical angle θ is determined based on the current values including the harmonic components of the electrical angle frequency, the determined electrical angle θ has a distorted waveform. When the motor is controlled by the electrical angle θ with the distorted waveform, the motor control may be unstable. Therefore, for example, when the motor A is driven at the rotation speed of 10 rps, a signal of 1500 Hz which is the third order component of the electrical angle frequency needs to be reduced.

Next, the filter order is described which is necessary for reducing the harmonic component signal included in the detected drive current. According to the present embodiment, it is necessary to calculate an average value of all pieces of current value data obtained in a period of the harmonic component to reduce the harmonic component signal. Specifically, for example, when a period of the harmonic component is 1000 μs, and a period at which the current value obtaining unit obtains the current value is 25 μs, the number of the current values obtained in a period of the harmonic component is 40 pieces. Therefore, in this case, in order to reduce the harmonic component signal of which the period is 1000 μs, the filter order is required to be greater than or equal to 40th order. According to the present embodiment, the harmonic component signal is reduced by calculating an average value of all pieces of the current value data obtained in a period of the harmonic component, however, the present embodiment is not limited to this configuration. For example, an average value may be calculated from all pieces of the current value data obtained in n periods (n is a positive integer) of the harmonic component. In addition, all pieces of the current value data obtained in n periods may not be used.

As described above, when the motor A is driven at the rotation speed of 10 rps, the frequency of the third order component signal of the electrical angle frequency is 1500 Hz (a period is 1/1500 s). Further, according to the present embodiment, the period at which the current value obtaining unit obtains the current value is 25 μs. Therefore, the number of the current values obtained in a period of the third order component signal of the electrical angle frequency when the motor A is driven at the rotation speed of 10 rps is calculated by a following equation.

$$(1/1500 \text{ s})/25 \text{ μs} \approx 26.7 \quad (10)$$

Therefore, when the motor A is driven at the rotation speed of 10 rps, a filter of 27th or greater order is required to reduce the third order component signal of the electrical angle frequency.

For example, when the motor A is driven at a rotation speed of 3 rps, the frequency of the third order component signal of the electrical angle frequency is 450 Hz (a period is 1/450 s). Further, according to the present embodiment, the period at which the current value obtaining unit obtains the current value is 25 μs. Therefore, the number of the current values obtained in a period of the third order component signal of the electrical angle frequency when the motor A is driven at the rotation speed of 3 rps is calculated by a following equation.

$$(1/450 \text{ s})/25 \text{ μs} \approx 88.8 \quad (11)$$

Therefore, when the motor A is driven at the rotation speed of 3 rps, a filter of 89th or greater order is required to reduce the third order component signal of the electrical angle frequency.

As described above, the frequency of the harmonic component signal varies depending on the rotation speed of the rotor. Therefore, when the rotation speed of the rotor changes from 10 rps to 3 rps, there is a possibility that the filter of the order set in advance cannot reduce the harmonic component signal. Specifically, when the motor A is driven at the rotation speed of 10 rps, the third order component signal can be reduced by setting the filter order at 30th order. However, when the motor A is driven at the rotation speed of 3 rps, the third order component signal may not be reduced if the filter order is 30th order.

In this case, it is considered to increase the filter order. In other words, it can be considered that the low-pass filter is configured to be able to set the filter order to greater than or equal to 89th order. However, as the filter order is greater, a capacity of the memory 514a is increased, and accordingly, the cost is increased. Further, as the filter order is greater, it is likely that a phase delay amount caused by filter processing is increased. In other words, a change in the filter order changes the phase delay amount caused by filter processing, and there is a possibility to cause an issue that a configuration for correcting the phase delay becomes complicated and the like.

Thus, the present embodiment adopts a following configuration for reducing a high-frequency signal included in a detected drive current without increasing the cost. According to the present embodiment, a method for reducing the harmonic component signal is described in the case that the motor control apparatus 157 changes the rotation speed of the rotor from 10 rps to 3 rps in a state that the filter order is 30th order as an example.

As described in the equations (10) and (11), the filter order necessary for reducing the harmonic component signal is determined by the number of the current value data pieces obtained in a period of the harmonic component. In other words, the filter order necessary for reducing the harmonic component signal is determined by the period (the sampling period) at which the current value obtaining unit obtains the current value data. Specifically, as the sampling period is longer, the number of the current value data pieces in a period of the harmonic component is reduced, and thus the filter order can be smaller.

Therefore, in order to reduce the harmonic component signal without increasing the filter order when the rotation speed for driving of the motor A is changed from 10 rps to 3 rps in the state that the filter order is 30th order, the sampling period may be prolonged. However, the sampling period is synchronized with the inverter period as described above, and when the sampling period is prolonged, the inverter period is also prolonged. When the inverter period is prolonged, responsiveness of the motor with respect to a command output from the CPU 151a is deteriorated. In addition, an issue such as noise occurs if the inverter period is not 50 μs or less (frequency is not greater than or equal to 20 kHz). In other words, an issue such as noise occurs if the sampling period is not 50 μs or less (frequency is not greater than or equal to 20 kHz). This is because a maximum value of an audible frequency range of human is about 20 kHz. Even if the sampling period is set to 50 μs, the filter order is required to be set to greater than or equal to 45th order to reduce the third order component signal at the rotation speed of 3 rps. In other words, if the sampling period is set to 50

μs, the third order component signal at the rotation speed of 3 rps cannot be reduced with the state that the filter order is 30th order as it is.

<Decimating Control>

As illustrated in FIG. 3, the motor control apparatus 157 according to the present embodiment is provided with the decimating controller 519. The current value obtaining unit 516 outputs the current values iα and iβ obtained from the A/D converter 510 to the decimating controller 519. The coordinate inverter 505 outputs the voltage values Vα and Vβ, of the drive voltage to the decimating controller 519. The decimating controller 519 thins out a part of data pieces of all of the obtained current values and voltage values and outputs to the low-pass filter 514.

Figure 7:
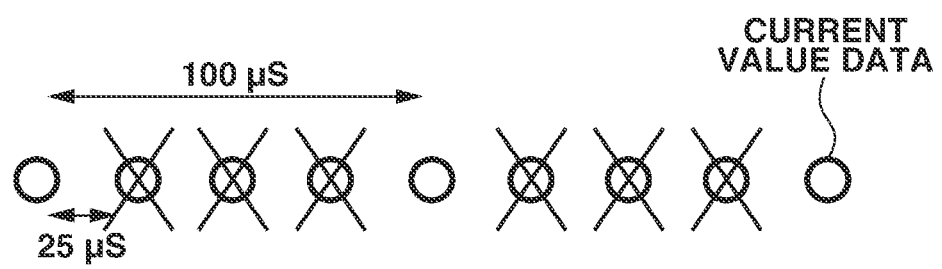
FIG. 7 illustrates a method how a decimating controller thins out current value data and voltage value data.

FIG. 7 illustrates a method how the decimating controller 519 thins out a part of data pieces of all of the obtained current values and voltage values. The method for decimating out a part of data pieces of all of the obtained current values by the decimating controller 519 is described below. The method for decimating out a part of data pieces of the voltage values is similar to the method for decimating out a part of data pieces of the current values, so that the description thereof is omitted.

As illustrated in FIG. 7, the decimating controller 519 thins out a part of all of the current value data pieces obtained by the current value obtaining unit 516 at the sampling period of 25 μs based on a determined decimating rate. Specifically, the decimating controller 519 performs decimating processing so that a time interval of the current value data pieces after the decimating processing will be, for example, 100 μs. Further, the decimating controller 519 outputs the current value data after the decimating processing to the low-pass filter 514. The decimating rate when the data is not thinned out is zero, and as the decimating rate is greater, the number of data pieces to be thinned out is increased. Accordingly, the current value data is obtained by the current value obtaining unit 516 at the sampling period 100 μs in appearance and input to the low-pass filter 514. In this case, the number of the current values obtained in a period of the third order component signal of the electrical angle frequency when the motor A is driven at the rotation speed of 3 rps is calculated using a following equation.

$$(1/450 \text{ s})/100 \text{ μs} \approx 22.2 \quad (12)$$

Therefore, in this case, the third order component signal of the electrical angle frequency when the motor A is driven at the rotation speed of 3 rps can be reduced by the filter of 23rd or greater order. In other words, the third order component signal at the rotation speed of 3 rps can be reduced with the state that the filter order is 30th order as it is. In this case, the filter order may be changed to 23rd order.

Next, a method for determining (setting) the decimating rate according to the present embodiment is described. According to the present embodiment, the decimating rate is determined based on the rotation speed of the rotor. In the following description, the sampling period is 25 μs, and the filter order of the low-pass filter is 30th order.

The CPU 151a according to the present embodiment calculates a rotation speed ω_ref' in place of a command speed ω_ref based on a temporal change of the command phase θ_ref. A following formula (13) is used in calculation.

$$\omega = d\theta/dt \quad (13)$$

The CPU 151a determines the decimating rate by the above-described method based on the rotation speed ω_ref', the sampling period, the filter order of the low-pass filter. Specifically, the CPU 151a determines the decimating rate as shown in the equation (12) so as to be able to reduce the harmonic component signal if the filter order is 30th order. The CPU 151a outputs the determined decimating rate to the decimating controller 519.

When the decimating rate is too large, the number of the current value data pieces becomes fewer, and the phase may not be accurately determined. According to the present embodiment, the phase can be accurately determined when 32 pieces of the current value data are included in a period of the first order component signal of the electrical angle frequency of the motor. Therefore, when the decimating rate is to be determined, the decimating rate is determined so that at least 32 pieces of the current value data are included in a period of the first order component signal of the electrical angle frequency of the motor.

The decimating controller 519 performs the decimating processing on the current values iα and iβ and the voltage values Vα and Vβ, based on the input decimating rate, and the current values iα and iβ and the voltage values Vα and Vβ, to which the decimating processing is applied are output to the low-pass filter 514. The low-pass filter 514 reduces the harmonic component signal by the above-described method. Further, the phase determiner 513 determines a phase θ based on the current value of which the harmonic component signal is reduced, and the motor control apparatus 157 controls the motor based on the determined phase θ. Accordingly, the motor control can be suppressed from being unstable.

Figure 8:
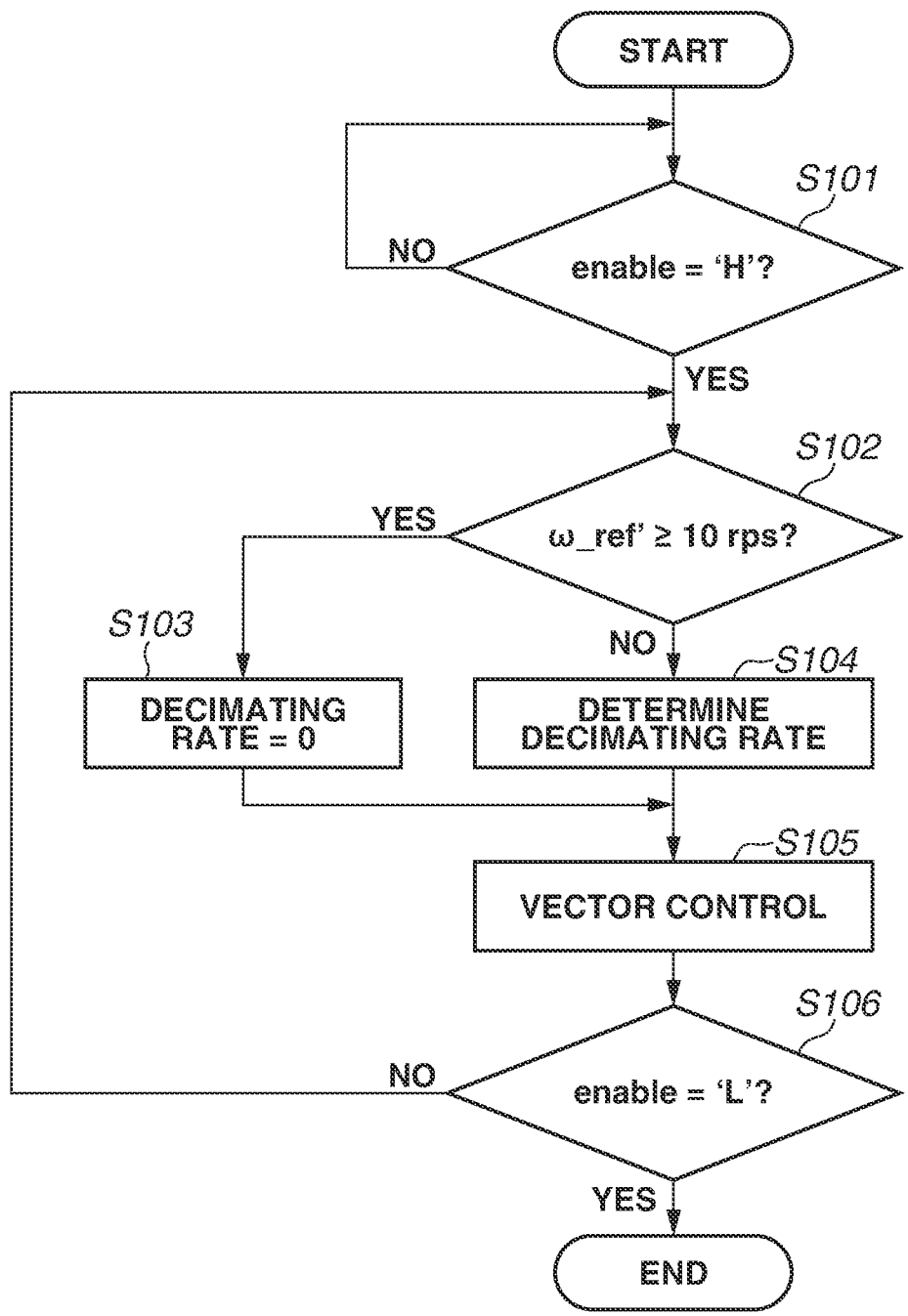
FIG. 8 is a flowchart illustrating a method for determining a decimating rate by the motor control apparatus.

FIG. 8 is a flowchart illustrating a method for determining the decimating rate by the motor control apparatus 157 according to the present embodiment. The method for determining the decimating rate according to the present embodiment is described below with reference to FIG. 8. Processing in the flowchart is executed by the motor control apparatus 157 receiving an instruction from the CPU 151a. In the following description, the filter order is set to 30th order in advance. Further, the sampling period is 25 μs.

First, in step S101, when an enable signal 'H' is output from the CPU 151a to the motor control apparatus 157, the motor control apparatus 157 starts control of the motor 509 based on a command output from the CPU 151a. An enable signal is a signal for permitting or prohibiting an operation of the motor control apparatus 157. When the enable signal is 'L (low level)', the CPU 151a prohibits the operation of the motor control apparatus 157. In other words, the control of the motor 509 by the motor control apparatus 157 is terminated. When the enable signal is 'H (high level)', the CPU 151a permits the operation of the motor control apparatus 157, and the motor control apparatus 157 controls the motor 509 based on the command output from the CPU 151a.

Next, in step S102, when the rotation speed ω_ref' is greater than or equal to 10 rps (YES in step S102), then in step S103, the CPU 151a sets the decimating rate to zero. This is because, when the rotation speed ω_ref' is greater than or equal to 10 rps, the harmonic component signal can be reduced without decimating out the current value data if the filter order is 30th order. The CPU 151a outputs the determined decimating rate to the decimating controller 519. Subsequently, the motor control apparatus 157 advances the processing to step S105.

In step S102, when the rotation speed ω_ref' is less than 10 rps (NO in step S102), then in step S104, the CPU 151a sets the decimating rate to a value greater than zero. In this regards, the decimating rate is set so as to satisfy following two conditions. The first condition is that the number of the current value data pieces after decimating is greater than or equal to 32 pieces in a period of the first order component signal of the electrical angle frequency of the motor. The second condition is that the decimating rate is set based on the rotation speed ω_ref. Specifically, for example, when the rotation speed ω_ref is 5 rps, the decimating rate corresponding to 5 rps is set, and when the rotation speed ω_ref is 3 rps, the decimating rate corresponding to 3 rps is set. The CPU 151a outputs the determined decimating rate to the decimating controller 519. Subsequently, the motor control apparatus 157 advances the processing to step S105.

Next, in step S105, the motor control apparatus 157 performs the decimating processing on the current value data obtained by the current value obtaining unit 516 based on the determined decimating rate and performs filter processing on the thinned-out current value data. Further, the motor control apparatus 157 performs the above-described vector control based on the current value data subjected to the filter processing.

Subsequently, the motor control apparatus 157 repeats the above-described control and controls the motor 509 until the CPU 151a outputs the enable signal 'L' to the motor control apparatus 157.

As described above, according to the present embodiment, the decimating processing is performed on data pieces of the current value and the voltage value, and the filter processing is performed on the current value and the voltage value subjected to the decimating processing. Accordingly, the harmonic component signal can be reduced without prolonging the sampling period or increasing the filter order. Further, the decimating rate is determined in response to the rotation speed of the rotor. Specifically, when the rotation speed ω_ref is greater than or equal to 10 rps, the decimating rate is set to zero. In other words, the decimating controller 519 does not perform the decimating processing. When the rotation speed ω_ref is less than 10 rps, the decimating rate is set to a value greater than zero. Accordingly, even in the case that the frequency of the harmonic component is changed due to the change in the rotation speed of the rotor, the harmonic component signal can be reduced without increasing the filter order than the order set in advance.

According to the present embodiment, the decimating rate is set to zero when the rotation speed ω_ref is greater than or equal to 10 rps, however, the decimating control may be performed when the rotation speed ω_ref is greater than or equal to 10 rps without limiting to the above-described case. In this case, the decimating rate when the rotation speed ω_ref is less than 10 rps is set to a value greater than the decimating rate when the rotation speed ω_ref is greater than or equal to 10 rps.

According to the present embodiment, 10 rps is set as a threshold value of the rotation speed of the rotor (a predetermined rotation speed) for determining whether to perform the decimating processing, however, the threshold value is not limited to the above-described one. Specifically, for example, the threshold value is set based on the filter order set in advance.

According to the present embodiment, the CPU 151a determines the decimating rate by calculating based on the rotation speed ω_ref, the sampling period, and the filter order of the low-pass filter, however, determination of the decimating rate is not limited to the above-described one. For example, the CPU 151a may determine the decimating rate based on a table indicating a relationship between the rotation speed ω_ref and the decimating rate stored in the ROM 151b.

According to the present embodiment, the CPU 151a determines the decimating rate, however, the present embodiment is not limited to this configuration. For example, the present embodiment may have a configuration in which the rotation speed ω_ref is input to the decimating controller 519, and the decimating controller 519 determines the decimating rate by the above-described method.

Configurations of an image forming apparatus and a low-pass filter 514 according to a second embodiment are similar to those of the first embodiment. A method that a motor control apparatus according to the present embodiment controls a motor is described below. A control method of the motor using vector control and the configuration of the low-pass filter 514 are similar to those of the first embodiment, and thus the descriptions thereof are omitted.

As described above, when a harmonic component signal is reduced by the low-pass filter constituted of a digital filter, a frequency band which can be reduced by the low-pass filter varies depending on an order of the filter. Specifically, as the filter order is greater, a harmonic component signal having a lower frequency is reduced. Therefore, in order to reduce the harmonic component signal having the lower frequency, it is necessary to increase the filter order.

The frequency of the harmonic component varies depending on a type of a motor. Therefore, when a motor is replaced, if a motor different in type from the motor before replacement is installed, the filter of the order set in advance may not be able to reduce the harmonic component signal. Specifically, for example, when a frequency of a harmonic component included in a detected current of the motor after replacement is lower than a frequency of a harmonic component included in a detected current of the motor before the replacement, there is a possibility that the filter of the order set in advance cannot reduce the harmonic component signal. When a phase of the rotor is determined based on the current value of which the harmonic component signal is not reduced, and the motor is controlled based on the determined rotation phase, the motor control may be unstable.

Next, a frequency of the harmonic component signal is described. In the following description, a motor A of which the number of magnetic poles of rotors is 100 (50 each in N pole and S pole) and a motor B of which the number of magnetic poles of rotors is 24 (12 each in N pole and S pole) are used. However, the number of magnetic poles of the motor to be used is not limited to the above-described one. According to the present embodiment, a period (a sampling period) at which the current value obtaining unit 516 obtains the current value is 25 µs.

As described in the first embodiment, when the motor A is driven at the rotation speed of 10 rps, an electrical angle frequency is 500 Hz.

Regarding the motor B having 24 pieces of the magnetic poles, a mechanical angle 30° corresponds to an electrical angle 360°. In other words, when the rotor of the motor B makes one round, the electrical angle makes 12 rounds. Therefore, for example, when the motor B is driven at the rotation speed of 10 rps, an electrical angle frequency is 120 Hz.

On the drive current detected by the current detector, not only a signal of the electrical angle frequency but also the harmonic component signal of the electrical angle frequency is superimposed. For example, a third order component, a fifth order component, and the like of the electrical angle frequency are superimposed.

Therefore, when the motor A is driven at the rotation speed of 10 rps, it is necessary to reduce a signal of 1500 Hz which is a third order component of the electrical angle frequency. When the motor B is driven at the rotation speed of 10 rps, it is necessary to reduce a signal of 360 Hz which is a third order component of the electrical angle frequency.

Next, the filter order is described which is necessary for reducing the harmonic component signal included in the detected drive current. In order to reduce the harmonic component signal, it is necessary to calculate an average value of all pieces of current value data obtained in a period of the harmonic component. Specifically, for example, when a period of the harmonic component is 1000 µs, and a period at which the current value obtaining unit obtains the current value is 25 µs, the number of the current values obtained in a period of the harmonic component is 40 pieces. Therefore, in this case, in order to reduce the harmonic component signal of which the period is 1000 µs, the filter order is required to be greater than or equal to 40th order. According to the present embodiment, the harmonic component signal is reduced by calculating an average value of all pieces of the current value data obtained in a period of the harmonic component, however, the present embodiment is not limited to this configuration. For example, an average value may be calculated from all pieces of the current value data obtained in n periods (n is a positive integer) of the harmonic component. In addition, all pieces of the current value data obtained in n periods may not be used.

As described in the first embodiment, when the motor A is driven at the rotation speed of 10 rps, a filter of 27th or greater order is required to reduce the third order component signal of the electrical angle frequency.

When the motor B is driven at the rotation speed of 10 rps, a frequency of the third order component signal of the electrical angle frequency is 360 Hz (the period is 1/360 S). Therefore, the number of the current values obtained in a period of the third order component signal of the electrical angle frequency when the motor B is driven at the rotation speed of 10 rps is calculated by a following equation.

$$(1/360 \text{ s})/25 \text{ µs} \approx 111.1 \qquad (14)$$

Therefore, when the motor B is driven at the rotation speed of 10 rps, a filter of 112th or greater order is required to reduce the third order component signal of the electrical angle frequency.

As described above, the frequency of the harmonic component signal varies depending on the number of magnetic poles of the motor. Therefore, when a motor of which the number of magnetic poles is different is installed by the replacement of the motor, the filter of the order set in advance may not be able to reduce the harmonic component signal. Specifically, for example, when the motor A is the one before the replacement, and the motor B is the one after the replacement, there is a possibility that the filter of the order set in advance cannot reduce the harmonic component signal. More specifically, for example, when the driving of the motor A is controlled, the third order component signal can be reduced by setting the filter order to 30th order. However, when the motor A is replaced with the motor B, the third order component signal cannot be reduced if the filter order is 30th order.

In this case, it can be considered to set the filter order to a greater order. In other words, it can be considered that the low-pass filter is configured to be able to set the filter order to greater than or equal to 112th order. However, as the filter order is greater, the capacity of the memory 514*a* is increased, and accordingly, the cost is increased. Further, as the filter order is greater, it is likely that a phase delay amount caused by filter processing is increased. In other words, a change in the filter order changes the phase delay amount caused by filter processing, and there is a possibility to cause an issue that a configuration for correcting the phase delay becomes complicated and the like.

Thus, the present embodiment adopts a following configuration for reducing a high-frequency signal included in a detected drive current without increasing the cost. A method for reducing the harmonic component signal in the case that the motor controlled by the motor control apparatus is replaced from the motor A to the motor B in a state that the filter order is 30th order is described below as an example of the present embodiment.

As described in the equations (10) to (14), the filter order necessary for reducing the harmonic component signal is determined by the number of the current values obtained in a period of the harmonic component. In other words, the filter order is determined by the period (the sampling period) at which the current value obtaining unit obtains the current value data. Specifically, as the sampling period is longer, the number of the current value data pieces in a period of the harmonic component is reduced, and thus the filter order can be smaller.

Therefore, in order to reduce the harmonic component signal in the low frequency without increasing the filter order when the motor is replaced from the motor A to the motor B in the state that the filter order is 30th order, the sampling period may be prolonged. However, the sampling period is synchronized with the inverter period as described above, and when the sampling period is prolonged, the inverter period is also prolonged. When the inverter period is prolonged, responsiveness of the motor with respect to a command output from the CPU 151*a* is deteriorated. In addition, an issue such as noise occurs if the inverter period is not 50 µs or less (frequency is not greater than or equal to 20 kHz). In other words, an issue such as noise occurs if the sampling period is not 50 µs or less (frequency is not greater than or equal to 20 kHz). This is because the maximum value of the audible frequency range of human is about 20 kHz. Even if the sampling period is set to 50 µs, the filter order is required to be set to greater than or equal to a 56th order to reduce the third order component signal of the motor B. In other words, if the sampling period is set to 50 µs, the third order component signal of the motor B cannot be reduced with the state that the filter order is 30th order as it is.

<Decimating Control>

Figure 9:
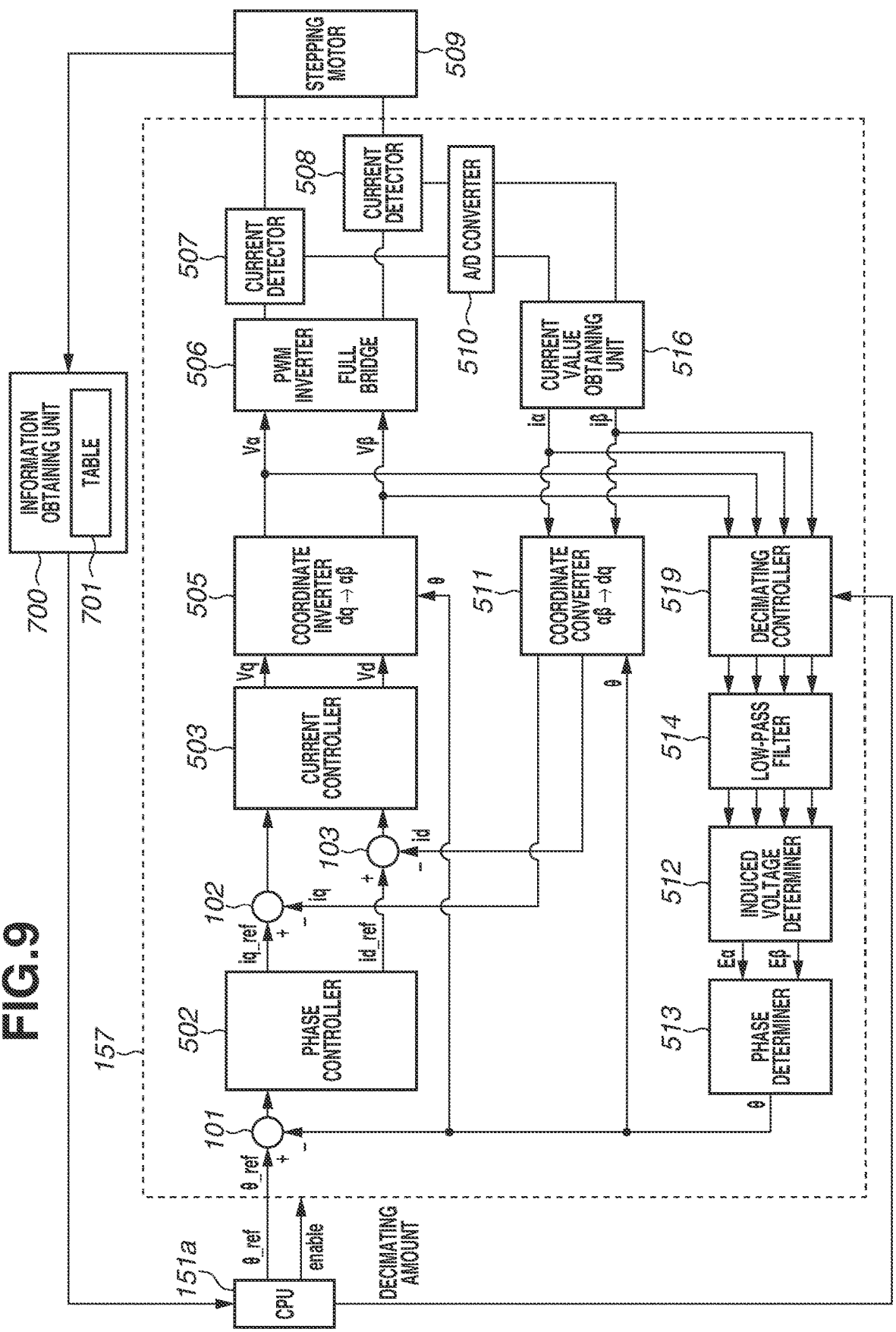
FIG. 9 is a block diagram illustrating a configuration of a motor control apparatus according to a second embodiment.

FIG. 9 is a block diagram illustrating the configuration of the motor control apparatus 157 according to the present embodiment.

As illustrated in FIG. 9, the motor control apparatus 157 according to the present embodiment is provided with the decimating controller 519. The current value obtaining unit 516 outputs the current values iα and iβ obtained from the A/D converter 510 to the decimating controller 519. The coordinate inverter 505 outputs the voltage values Vα and Vβ, of the drive voltage to the decimating controller 519. The decimating controller 519 thins out a part of data pieces of all of the obtained current values and voltage values and outputs to the low-pass filter 514.

The decimating controller 519 thins out a part of all of the current value data pieces obtained by the current value obtaining unit 516 at the sampling period of 25 µs based on a determined decimating rate. Specifically, the decimating controller 519 performs decimating processing so that a time interval of the current value data pieces after the decimating processing will be, for example, 100 µs. Further, the decimating controller 519 outputs the current value data after the decimating processing to the low-pass filter 514. Accordingly, the current value data is obtained by the current value obtaining unit 516 at the sampling period 100 μs in appearance and input to the low-pass filter 514. In this case, the number of the current values obtained in a period of the third order component signal of the electrical angle frequency when the motor B is driven at the rotation speed of 10 rps is calculated by a following equation.

$$(\tfrac{1}{360}\ s)/100\ \mu s \approx 27.7 \tag{15}$$

Therefore, in this case, the third order component signal of the electrical angle frequency when the motor B is driven at the rotation speed of 10 rps can be reduced by the filter of 28th or greater order. In other words, the third order component signal of the motor B can be reduced with the state that the filter order is 30th order as it is. In this case, the filter order may be changed to 28th order.

Next, a method for determining a type of the motor installed in the motor control apparatus and a method for determining the decimating rate based on the determined result are described. According to the present embodiment, the number of magnetic poles of the installed motor is determined, and the decimating rate is determined based on the determined result. In the following description, the motor is driven at the rotation speed of 10 rps. In addition, the sampling period is 25 μs, and the filter order of the low-pass filter is 30th order.

According to the present embodiment, an information obtaining unit 700 illustrated in FIG. 9 obtains motor information. Specifically, the motor installed in the motor control apparatus 157 is provided with, for example, a bar code for determining the type of the motor, and the information obtaining unit 700 reads the bar code. The information obtaining unit 700 includes a table 701 indicating a relationship of the bar code and the motor information and obtains the motor information by referring to the table 701. The motor information corresponds to, for example, the number of magnetic poles of the rotor of the motor. The information obtaining unit 700 outputs the obtained information to the CPU 151a.

According to the present embodiment, the information obtaining unit 700 reads the bar code attached to the motor, and thus the CPU 151a obtains the motor information, however, the present embodiment is not limited to this configuration. For example, when replacing the motor, a service person may use the operation unit 152 to transmit information of the installed motor to the CPU 151a, and thus the CPU 151a may obtain the motor information.

The CPU 151a determines the decimating rate using the above-described method based on the number of magnetic poles of the motor, the rotation speed of the motor, the sampling period, and the filter order of the low-pass filter. Specifically, the CPU 151a determines the decimating rate as the formula (15) so as to be able to reduce the harmonic component signal if the filter order is 30th order. The CPU 151a outputs the determined decimating rate to the decimating controller 519. The decimating controller 519 stores the input decimating rate in a memory not illustrated.

When the decimating rate is too large, the number of the current value data pieces becomes fewer, and the phase may not be accurately determined. According to the present embodiment, the phase can be accurately determined when 32 pieces of the current value data are included in a period of the first order component signal of the electrical angle frequency of the motor. Therefore, when the decimating rate is to be determined, the decimating rate is determined so that at least 32 pieces of the current value data are included in a period of the first order component signal of the electrical angle frequency of the motor.

The decimating controller 519 performs the decimating processing on the current values $i\alpha$ and $i\beta$ and the voltage values $V\alpha$ and $V\beta$, based on the decimating rate stored in the memory and outputs the current values $i\alpha$ and $i\beta$ and the voltage values $V\alpha$ and $V\beta$, subjected to the decimating processing to the low-pass filter 514. The low-pass filter 514 reduces the harmonic component signal by the above-described method. Further, the phase determiner 513 determines the phase $\theta$ based on the current value of which the harmonic component signal is reduced, and the motor control apparatus 157 controls the motor based on the phase determination result. Accordingly, the motor control can be suppressed from being unstable.

Figure 10A:
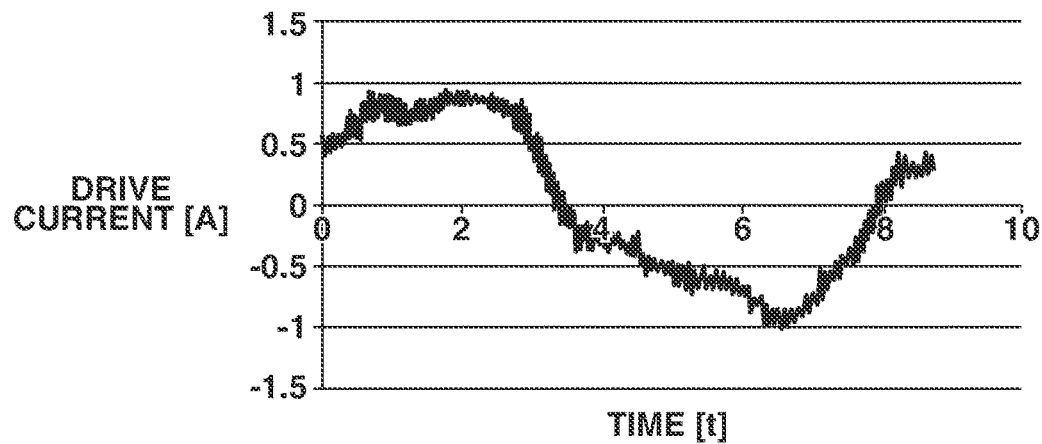
FIGS. 10A, 10B, and 10C illustrate current waveforms according to the second embodiment.

FIG. 10A illustrates a waveform of a current obtained by the current value obtaining unit 516 at the sampling period of 25 μs when the motor B is driven at the rotation speed of 10 rps. As illustrated in FIG. 10A, the current waveform is distorted due to the harmonic component such as the third order component of the electrical angle frequency.

Figure 10B:
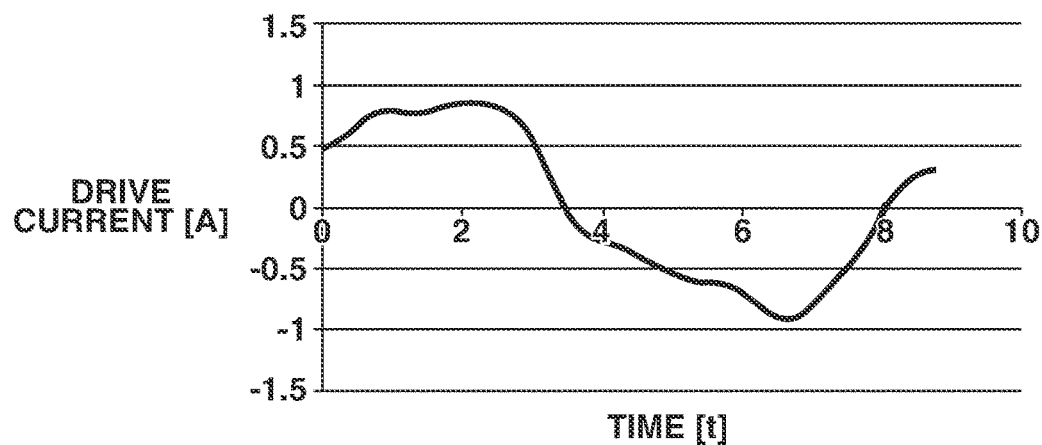

FIG. 10B illustrates a waveform of a current when a filter of 30th order is applied to the current illustrated in FIG. 10A. When the motor B is driven at the rotation speed of 10 rps, a frequency of a signal which can be reduced by the filter of 30th order is derived from a following equation (16).

$$1/(25\ \mu s * 30) = 1333.3 \tag{16}$$

Thus, if the filter of 30th order is used when the motor B is driven at the rotation speed of 10 rps, the harmonic component signal in a frequency greater than or equal to 1333.3 Hz can be reduced. The first order component of the electrical angle frequency is in 120 Hz when the motor B is driven at the rotation speed of 10 rps, and thus a signal of a component greater than or equal to 12th order in the electrical angle frequency is reduced in the current waveform illustrated in FIG. 10B by applying the filter of 30th order. However, as described above, if the filter of 30th order is applied to the current value data obtained by the current value obtaining unit 516 at the sampling period of 25 μs in the state that the motor B is driven at the rotation speed of 10 rps, the third order component signal of the electrical angle frequency cannot be reduced. Therefore, in the current waveform illustrated in FIG. 10B, distortion due to the harmonic component such as the third order component of the electrical angle frequency is remained.

Figure 10C:
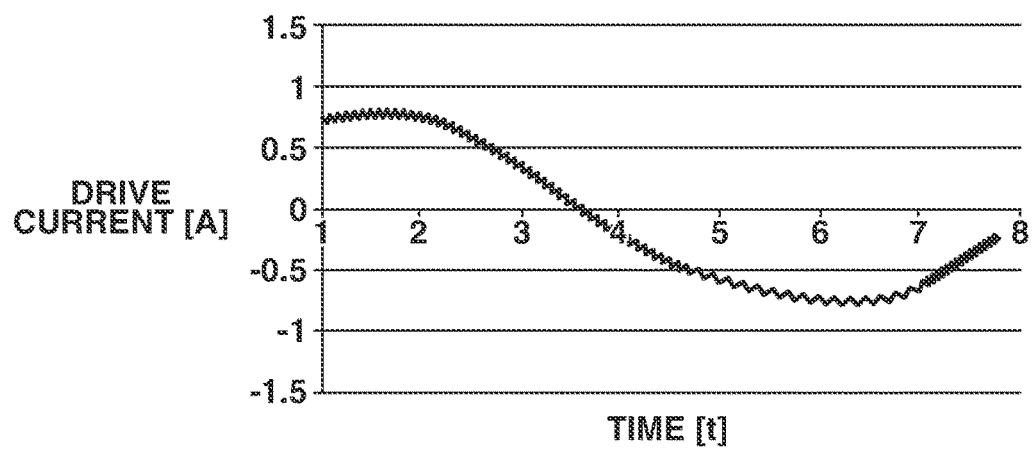

FIG. 10C illustrates a waveform of a current when the decimating processing is applied to the current illustrated in FIG. 10B. Since the above-described decimating processing is applied, a signal of a component greater than or equal to third order in the electrical angle frequency is reduced in the current waveform illustrated in FIG. 10C compared to the current waveform illustrated in FIG. 10B. The phase $\theta$ is determined based on the current waveform illustrated in FIG. 10C, the motor is controlled based on the phase determination result, and thus the motor control can be suppressed from being unstable.

Figure 11:
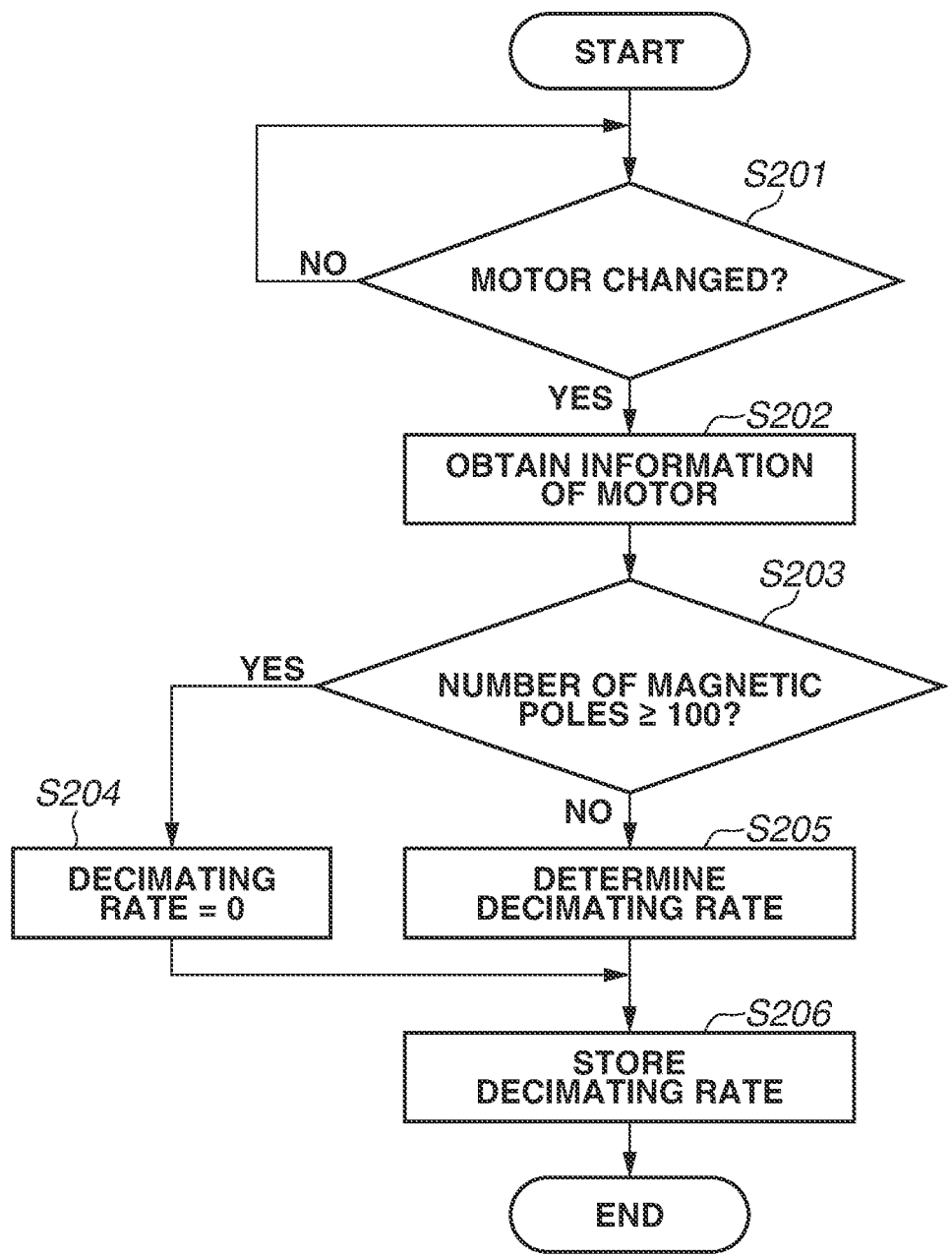
FIG. 11 is a flowchart illustrating a method for determining a decimating rate by the motor control apparatus.

FIG. 11 is a flowchart illustrating a method for determining the decimating rate by the motor control apparatus 157 according to the present embodiment. The method for determining the decimating rate according to the present embodiment is described below with reference to FIG. 11. Processing in the flowchart is executed by the CPU 151a. In addition, the processing in the flowchart is executed, for example, when a service person replaces the motor and inputs the replacement of the motor to the CPU 151a using the operation unit 152. In the following description, the filter order is set to 30th order in advance. The rotation speed of the rotor is 10 rps. Further, the sampling period is 25 μs.

First, in step S201, when the motor is replaced (YES in step S201), then in step S202, the information obtaining unit 700 obtains information of the installed motor (information of the number of magnetic poles) by the above-described method.

Next, in step S203, when the number of magnetic poles of the rotor of the installed motor is greater than or equal to 100 (YES in step S203), the CPU 151a advances the processing to step S204. In step S204, the CPU 151a sets the decimating rate to zero. This is because, when the number of magnetic poles is greater than or equal to 100, the harmonic component signal can be reduced without decimating out the current value data if the filter order is 30th order. The CPU 151a outputs the determined decimating rate to the decimating controller 519. Subsequently, the CPU 151a advances the processing to step S206.

In step S203, when the number of magnetic poles of the rotor of the installed motor is less than 100 (NO in step S203), the CPU 151a advances the processing to step S205. In step S205, the CPU 151a sets the decimating rate to a value greater than zero by the above-described method. In this regards, the decimating rate is set so as to satisfy the following two conditions. The first condition is that the number of the current value data pieces after decimating is greater than or equal to 32 pieces in a period of the first order component signal of the electrical angle frequency of the motor. The second condition is that the decimating rate is set based on the number of magnetic poles. Specifically, for example, when the number of magnetic poles is 50 pieces, the decimating rate corresponding to 50 pieces is set, and when the number of magnetic poles is 24 pieces, the decimating rate corresponding to 24 pieces is set. The CPU 151a outputs the determined decimating rate to the decimating controller 519. Subsequently, the CPU 151a advances the processing to step S206.

Subsequently, in step S206, the decimating controller 519 stores the input decimating rate in the memory not illustrated.

As described above, according to the present embodiment, the decimating processing is performed on data pieces of the current value and the voltage value, and the filter processing is performed on the current value and the voltage value subjected to the decimating processing. Accordingly, the harmonic component signal can be reduced without prolonging the sampling period or increasing the filter order. Further, when the motor is replaced, the decimating rate for decimating out data pieces of the current value and the voltage value is set (determined) according to a type (the number of magnetic poles) of the installed motor. Specifically, when a user inputs the replacement of the motor to the CPU 151a using the operation unit 152, the CPU 151a determines the decimating rate based on the number of magnetic poles of the motor. More specifically, the CPU 151a determines the decimating rate as zero when the number of magnetic poles of the rotor is greater than or equal to 100. In other words, the decimating controller 519 does not perform the decimating processing. When the number of magnetic poles of the rotor is less than 100, the CPU 151a sets the decimating rate to a value greater than zero. Accordingly, if the frequency of the harmonic component included in the detected current of the motor after replacement is lower than the frequency of the harmonic component included in the detected current of the motor before the replacement, the harmonic component signal can be reduced without increasing the filter order. In other words, if a motor different in type is installed by the replacement of the motor, the harmonic component signal can be reduced without increasing the order of the filter which is set in advance.

According to the present embodiment, the decimating rate is set to zero when the number of magnetic poles is greater than or equal to 100, however, the decimating control may be performed when the number of magnetic poles is greater than or equal to 100 without limiting to the above-described case. In this case, the decimating rate when the number of magnetic poles is less than 100 is set to a value greater than the decimating rate when the number of magnetic poles is greater than or equal to 100.

According to the present embodiment, a value 100 as the number of magnetic poles of the rotor is set as a threshold value for determining whether to set the decimating rate to zero, however, the threshold value is not limited to the above-described one.

According to the present embodiment, the decimating rate determination method is described when the rotation speed for driving the motor is 10 rps, and the motor A is replaced with the motor B, however, the present embodiment is not limited to the above-described one. For example, a configuration may be used which is a combination of a configuration for determining the decimating rate based on the rotation speed as described in the first embodiment and a configuration for determining the decimating rate based on the number of magnetic poles of the motor as described in the present embodiment. In other words, a configuration for determining the decimating rate based on the rotation speed of the rotor and the number of magnetic poles of the motor may be used. Accordingly, in the case that the motor is replaced, and the motor is driven at a plurality of rotation speeds, the harmonic component signal can be reduced without increasing the filter order.

According to the present embodiment, the CPU 151a determines the decimating rate by calculating based on the motor information, the rotation speed, the sampling period, and the filter order of the low-pass filter, however, determination of the decimating rate is not limited to the above-described one. For example, the CPU 151a may determine the decimating rate based on a table indicating a relationship of the motor information and the decimating rate stored in the ROM 151b.

According to the present embodiment, the CPU 151a determines the decimating rate, however, the present embodiment is not limited to this configuration. For example, the motor information, the rotation speed, and the like are input to the decimating controller 519, the decimating controller 519 may determine the decimating rate.

The configuration for determining the phase described in the first and the second embodiments can accurately determine the phase when 32 pieces of the current value data are included in a period of the first order component signal of the electrical angle frequency of the motor, however, the configuration is not limited to the above-described one.

The decimating processing according to the first and the second embodiments may be applied to not only the filter processing by the low-pass filter but also a case when a band-pass filter and the like is used.

According to the first and the second embodiments, the decimating rate is determined based on the rotation speed ω_ref in place of the command speed ω_ref, however, determination of the decimating rate is not limited to the above-described one. For example, an actual rotation speed co of the rotor may be detected, and the decimating rate may be determined based on the relevant rotation speed co.

Configurations of an image forming apparatus and a low-pass filter 514 according to a third embodiment are similar to those of the first embodiment. A method that a motor control apparatus according to the present embodiment controls a motor is described below. A drive control method of the motor using vector control and the configuration of the low-pass filter 514 are similar to those of the first embodiment, and thus the descriptions thereof are omitted.

According to the first and the second embodiments, the current value obtained by the current value obtaining unit 516 is used to control the drive current to be supplied to the winding and to determine the rotation phase as illustrated in FIGS. 4 and 9. In a process for determining a rotation phase, it is necessary to prolong the sampling period so as to reduce the third order component signal of the harmonic component by the filter order set in advance. However, the sampling period is synchronized with the inverter period, and when the sampling period is prolonged, the inverter period is also prolonged. Accordingly, in the process for controlling the drive current to be supplied to the winding, issues such as deterioration of responsiveness of the motor and noise may occur. Therefore, according to the first and the second embodiments, all of the current values obtained at the sampling period of 25 µs at which the above-described issues hardly occur are used in the control of the drive current to be supplied to the winding. In addition, in the process for determining the rotation phase, a part of all of the current value data pieces obtained at the sampling period of 25 µs is used. Specifically, a part of all of the current value data pieces obtained at the sampling period of 25 µs is thinned out by the determined decimating rate so as to prolong the sampling period in appearance.

Figure 12:
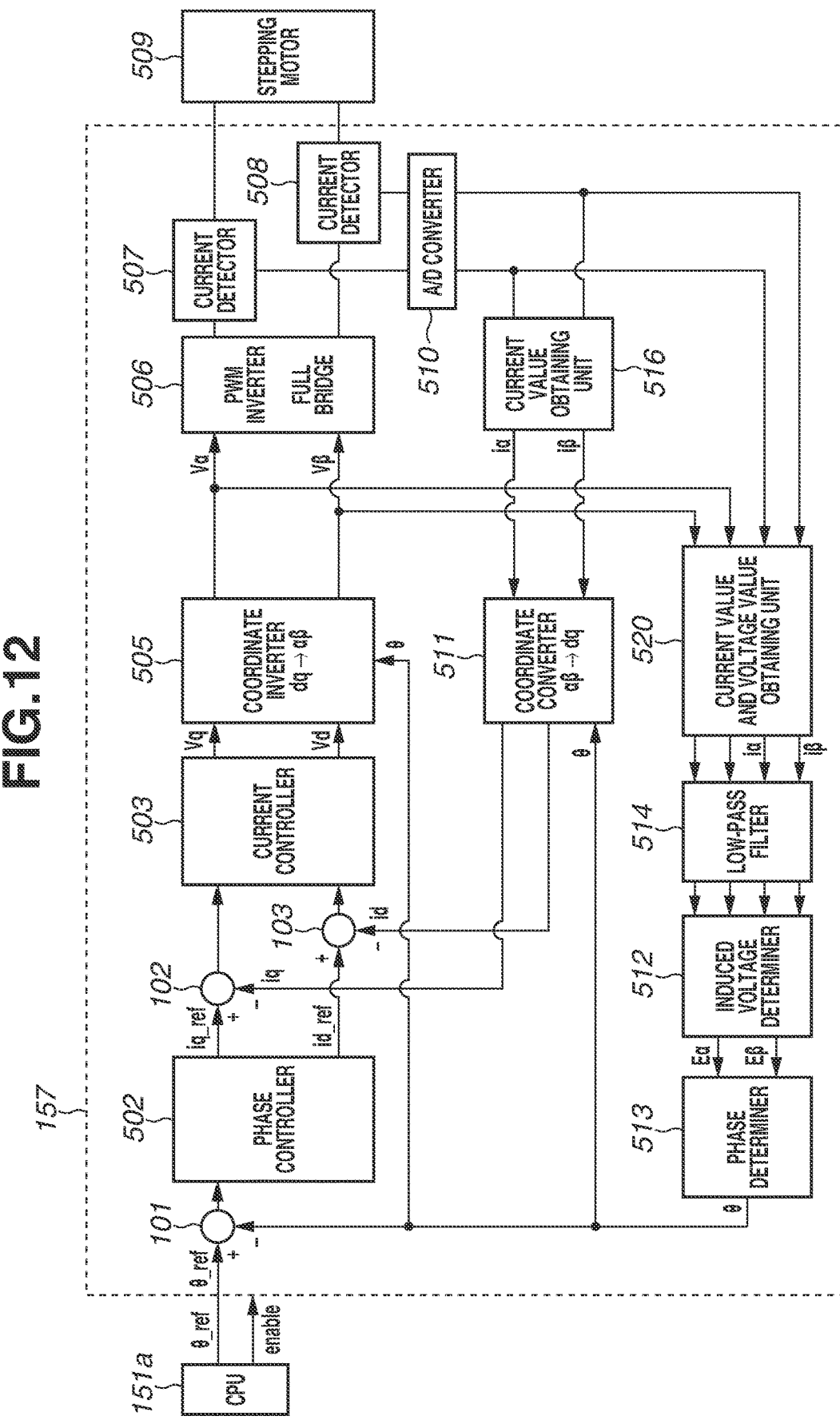
FIG. 12 is a block diagram illustrating a configuration of a motor control apparatus according to a third embodiment.

According to the present embodiment, as illustrated in FIG. 12, the motor control apparatus 157 includes the current value obtaining unit 516 for obtaining the current value used when the drive current to be supplied to the winding is controlled and a current value and voltage value obtaining unit 520 for obtaining the current value and the voltage value used when the rotation phase is determined. In other words, the motor control apparatus 157 separately includes a configuration for obtaining data used for controlling the drive current to be supplied to the winding and a configuration for obtaining data used for determining the rotation phase.

The current value and voltage value obtaining unit 520 includes a configuration which can change a sampling period. To a method for determining the sampling period by the current value and voltage value obtaining unit 520, the determining method based on the rotation speed $\omega\_ref$ described in the first embodiment and the determining method based on the number of magnetic poles described in the second embodiment can be applied.

In the above-described configuration, when the sampling period of the current value obtaining unit 516 is set to 25 µs, occurrence of issues such as deterioration of responsiveness of the motor and noise can be reduced if the sampling period of the current value and voltage value obtaining unit 520 is set to greater than or equal to 50 µs. In other words, the harmonic component signal can be reduced without causing the issues such as deterioration of responsiveness of the motor and noise, increasing the filter order than the order set in advance, and performing the decimating processing.

Figure 13:
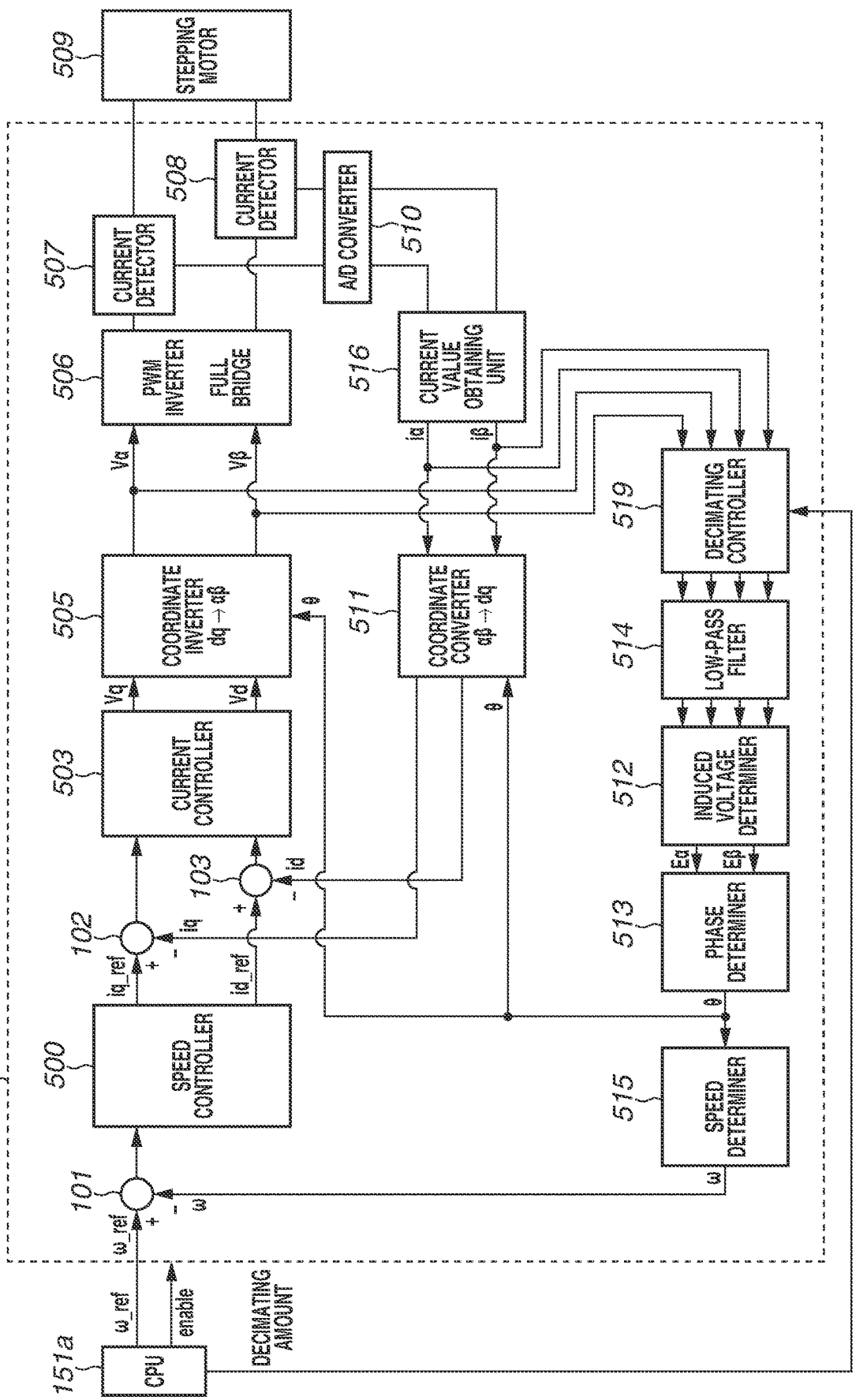
FIG. 13 is a block diagram illustrating a configuration of a motor control apparatus which performs speed feedback control.

In the vector control according to the first to the third embodiments, the motor 509 is controlled by performing the phase feedback control, however, the control is not limited to the above-described one. For example, the motor 509 may be controlled by feeding back the rotation speed $\omega$ of the rotor 402. Specifically, as illustrated in FIG. 13, the motor control apparatus includes a speed determiner 515 therein, and the speed determiner 515 determines the rotation speed $\omega$ based on a temporal change of the rotation phase $\theta$ output from the phase determiner 513. The formula (13) is used to determine the speed. Subsequently, the CPU 151a output a command speed $\omega\_ref$ representing a target speed of the rotor. Further, the motor control apparatus includes a speed controller 500 therein, and the speed controller 500 generates and outputs the q axis current command value iq_ref so as to reduce a deviation between the rotation speed $\omega$ and the command speed $\omega$ ref. The configuration for controlling the motor 509 by performing such speed feedback control may be adopted. The rotation speed is fed back in the configuration, and thus the rotation speed of the rotor can be controlled to be a predetermined speed. Therefore, the image forming apparatus applies the vector control using the speed feedback control to the motor for driving the load (i.e., the photosensitive drum, the conveyance belt, and the like) of which a rotation speed is necessary to be controlled at constant to appropriately form an image on a recording medium. Accordingly, image forming can be appropriately performed on the recording medium.

According to the first to the third embodiments, the rotation speed $\omega\_ref$ is determined based on a change amount in a predetermined period of the command phase $\theta\_ref$, however, the configuration is not limited to the above-described one. For example, the rotation speed $\omega\_ref$ may be determined based on a period at which a magnitude of a periodic signal correlated to a rotation period of the rotor 402 becomes zero, such as the drive current i$\alpha$ or i$\beta$, the drive voltage V$\alpha$ or V$\beta$, the induced voltage E$\alpha$ or E$\beta$, or the like.

According to the first to the third embodiments, a stepping motor is used as a motor for driving a load, however, other motor such as a direct current (DC) motor may be used. Further, the first to the third embodiments can be applied to a motor not only a two-phase motor but also a three-phase motor and other motors.

According to the first to the third embodiments, a permanent magnet is used as the rotor, however, the configuration is not limited to the above-described one.

According to an embodiment, a filter circuit reduces a high-frequency signal from current values of which the number is less than or equal to the number of the current values obtained by the obtaining unit at a predetermined period. Accordingly, the high-frequency signal can be reduced without increasing the filter order. In other words, a harmonic component can be reduced without increasing a cost.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-184723, filed Sep. 21, 2016, which is hereby incorporated by reference herein in its entirety.

What is claimed is:

1. A motor control apparatus comprising:
   a detector configured to detect a drive current flowing through a winding of a motor;
   an acquirer configured to acquire a current value of the drive current detected by the detector at a predetermined period;

a storage unit configured to store a predetermined number of current values acquired by the acquirer;

a filter circuit configured to apply filter processing to the predetermined number of the current values stored in the storage unit, wherein the filter processing is processing for reducing a harmonic component in a fundamental frequency of the drive current included in a signal represented by the current value acquired by the acquirer;

a phase determiner configured to determine a rotation phase of a rotor of the motor based on a value to which the filter processing is applied; and a controller configured to control the drive current flowing through the winding based on a torque current component, wherein the torque current component is a current component represented by a rotating coordinate system based on the rotation phase determined by the phase determiner and is a component generating torque on the rotor, wherein the predetermined number is less than a number of the current value acquirable by the acquirer within a period of one cycle of the harmonic component, wherein the period of one cycle of the harmonic component is longer than the predetermined period.

2. The motor control apparatus according to claim 1, further comprising a decimating unit configured to thin out a part of all of current value data pieces acquired by the acquirer at the predetermined period at a predetermined decimating rate, wherein, in a case that a rotation speed corresponding to a instructed speed representing a target speed of the rotor is a first rotation speed, the decimating unit thins out the current value data at a first decimating rate, wherein, in a case that the rotation speed is a second rotation speed which is less than the first rotation speed, the decimating unit thins out the current value data at a second decimating rate which is greater than the first decimating rate, and wherein the filter circuit reduces a harmonic component from a signal represented by a current value to which decimating processing is applied by the decimating unit.

3. The motor control apparatus according to claim 2, wherein the first decimating rate and the second decimating rate are determined based on the rotation speed corresponding to the instructed speed.

4. The motor control apparatus according to claim 2, wherein, in a case that a number of magnetic poles of the motor controlled by the controller is a first number, the decimating unit does not thin out the current value data, and wherein, in a case that the number of magnetic poles is a second number larger than the first number, the decimating unit thins out the current value data at a decimating rate.

5. The motor control apparatus according to claim 2, wherein the decimating unit thins out the current value data at a decimating rate determined based on a number of magnetic poles of the motor controlled by the controller and the rotation speed corresponding to the instructed speed.

6. The motor control apparatus according to claim 2, wherein, in a case that the rotation speed corresponding to the instructed speed is greater than or equal to a predetermined rotation speed, the decimating unit does not thin out the current value data.

7. The motor control apparatus according to claim 6, wherein the storage unit is configured to store the predetermined number of the current value to which decimating processing is applied by the decimating unit, and wherein the filter circuit is a digital filter configured to reduce the harmonic from the signal component by calculating an average value of the predetermined number of the current value stored in the storage unit.

8. The motor control apparatus according to claim 7, wherein the predetermined rotation speed is determined based on an order of the digital filter set in advance.

9. The motor control apparatus according to claim 1, wherein the controller controls the drive current flowing through the winding based on the torque current component to reduce a deviation between an instructed phase representing a target phase of the rotor of the motor and the rotation phase determined by the phase determiner.

10. The motor control apparatus according to claim 1, further comprising a speed determiner configured to determine a rotation speed of the rotor based on the value to which the filter processing is applied, wherein the controller is configured to control the drive current flowing through the winding to reduce a deviation between an instructed speed representing a target speed of the rotor and the rotation speed determined by the speed determiner.

11. The motor control apparatus according to claim 1, wherein the harmonic component is a third order component in the fundamental frequency.

12. The motor control apparatus according to claim 1, wherein the harmonic component is a fifth order component in the fundamental frequency.

13. A sheet conveyance apparatus comprising:

a conveyance roller configured to convey a sheet;

a motor configured to drive the conveyance roller;

a detector configured to detect a drive current flowing through a winding of the motor;

an acquirer configured to acquire a current value of the drive current detected by the detector at a predetermined period;

a storage unit configured to store a predetermined number of current values acquired by the acquirer;

a filter circuit configured to apply filter processing to the predetermined number of the current values stored in the storage unit, wherein the filter processing is processing for reducing a harmonic component in a fundamental frequency of the drive current included in a signal represented by the current value acquired by the acquirer;

a phase determiner configured to determine a rotation phase of a rotor of the motor based on a value to which the filter processing is applied; and a controller configured to control the drive current flowing through the winding based on a torque current component, wherein the torque current component is a current component represented by a rotating coordinate system based on the rotation phase determined by the phase determiner and is a component generating torque on the rotor, wherein the predetermined number is less than a number of the current value acquirable by the acquirer within a period of one cycle of the harmonic component, and wherein the period of one cycle of the harmonic component is longer than the predetermined period.

14. An image forming apparatus comprising:

an image forming unit configured to form an image on a recording medium;

a motor configured to drive a load;

a detector configured to detect a drive current flowing through a motor winding of the motor;

an acquirer configured to acquire a current value of the drive current detected by the detector at a predetermined period;

a storage unit configured to store a predetermined number of current values acquired by the acquirer;

a filter circuit configured to apply filter processing to the predetermined number of the current values stored in the storage unit, wherein the filter processing is processing for reducing a harmonic component in a fundamental frequency of the drive current included in a signal represented by the current value acquired by the acquirer;

a phase determiner configured to determine a rotation phase of a rotor of the motor based on a value to which the filter processing is applied; and a controller configured to control the drive current flowing through the winding based on a torque current component, wherein the torque current component is a current component represented by a rotating coordinate system based on the rotation phase determined by the phase determiner and is a component generating torque on the rotor, wherein the predetermined number is less than a number of the current value acquirable by the acquirer within a period of one cycle of the harmonic component, and wherein the period of one cycle of the harmonic component is longer than the predetermined period.

15. A motor control apparatus comprising:

a detector configured to detect a drive current flowing through a winding of a motor;

an acquirer configured to acquire a current value of the drive current detected by the detector at a predetermined period;

a storage unit configured to store a predetermined number of current values acquired by the acquirer;

a filter circuit configured to apply filter processing to the predetermined number of the current values stored in the storage unit, wherein the filter processing is processing for reducing a harmonic component in a fundamental frequency of the drive current included in a signal represented by the current value acquired by the acquirer;

a phase determiner configured to determine a rotation phase of a rotor of the motor based on a value to which the filter processing is applied; and a controller configured to control the drive current flowing through the winding of the motor to reduce a deviation between an instructed phase representing a target phase of the rotor of the motor and the rotation phase determined by the phase determiner, wherein the predetermined number is less than a number of the current value acquirable by the acquirer within a period of one cycle of the harmonic component, wherein the period of one cycle of the harmonic component is longer than the predetermined period.

* * * * *